US011337118B2

(12) United States Patent
Ingale et al.

(10) Patent No.: US 11,337,118 B2
(45) Date of Patent: May 17, 2022

(54) METHOD AND SYSTEM FOR PERFORMING HANDOVER IN WIRELESS COMMUNICATION NETWORK

(71) Applicant: Samsung Electronics Co., Ltd, Suwon-si (KR)

(72) Inventors: Mangesh Abhimanyu Ingale, Bangalore (IN); Neha Sharma, Bangalore (IN); Anil Agiwal, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/638,442

(22) PCT Filed: Aug. 13, 2018

(86) PCT No.: PCT/KR2018/009274
§ 371 (c)(1),
(2) Date: Feb. 11, 2020

(87) PCT Pub. No.: WO2019/031947
PCT Pub. Date: Feb. 14, 2019

(65) Prior Publication Data
US 2020/0178128 A1 Jun. 4, 2020

(30) Foreign Application Priority Data

Aug. 11, 2017 (IN) .............................. 201741028700
Aug. 9, 2018 (IN) .............................. 201741028700

(51) Int. Cl.
*H04W 4/00* (2018.01)
*H04W 36/00* (2009.01)

(52) U.S. Cl.
CPC .............................. *H04W 36/0022* (2013.01)

(58) Field of Classification Search
CPC ............. H04W 28/00; H04W 28/0252; H04W 28/0257; H04W 28/0263; H04W 28/085;
(Continued)

(56) References Cited

U.S. PATENT DOCUMENTS

2014/0056243 A1\* 2/2014 Pelletier .............. H04W 52/365
370/329
2015/0181473 A1 6/2015 Horn et al.
(Continued)

FOREIGN PATENT DOCUMENTS

CN 106231637 A 12/2016
CN 107018542 A 8/2017
(Continued)

OTHER PUBLICATIONS

Huawei (rapporteur), "Summary of [97bis#12][NR] Bearer type change (Huawei)", 3GPP TSG-RAN WG2 Meeting #98, May 15-19, 2017, R2-17005155, 27 pages.
(Continued)

*Primary Examiner* — Matthew W Genack

(57) ABSTRACT

Embodiments herein disclose a method for performing a handover in a wireless communication network. The method includes performing, by a network, a Packet Data Convergence Protocol (PDCP) version change for one or more radio bearers to switch from a first PDCP entity to a second PDCP entity. Further, the method includes receiving, by a User Equipment (UE), at least one of a PDCP version change indication and security key change indication from the network. Furthermore, the method includes performing, by the UE, a PDCP version change to switch from the first PDCP entity to the second PDCP entity for a configured radio bearer in response to receiving the PDCP version change indication.

8 Claims, 21 Drawing Sheets

(58) Field of Classification Search
CPC ......... H04W 36/0011; H04W 36/0022; H04W 36/0027; H04W 76/20; H04W 76/27
See application file for complete search history.

(56) References Cited

U.S. PATENT DOCUMENTS

| | | |
|---|---|---|
| 2016/0029245 A1 | 1/2016 | Hong et al. |
| 2016/0212661 A1 | 7/2016 | Basu Mallick et al. |
| 2016/0226632 A1 | 8/2016 | Zhang et al. |
| 2016/0277992 A1 | 9/2016 | Cao |
| 2016/0309389 A1 | 10/2016 | Laraqui et al. |
| 2016/0316508 A1 | 10/2016 | Hong et al. |
| 2016/0366175 A1 | 12/2016 | Basu Mallick et al. |
| 2017/0013668 A1 | 1/2017 | Chang et al. |
| 2017/0215225 A1 | 7/2017 | Yi et al. |
| 2017/0230780 A1 | 8/2017 | Chincholi et al. |
| 2017/0230873 A1 | 8/2017 | Baek et al. |
| 2020/0196374 A1* | 6/2020 | Lim ..................... H04W 76/27 |

FOREIGN PATENT DOCUMENTS

| | | |
|---|---|---|
| EP | 3072351 A1 | 9/2016 |
| KR | 10-2015-0086171 A | 7/2015 |
| KR | 10-2016-0128400 A | 11/2016 |
| KR | 10-2017-0041658 A | 4/2017 |
| WO | 2016122814 A1 | 8/2016 |
| WO | 2016130061 A1 | 8/2016 |
| WO | 2017014802 A1 | 1/2017 |
| WO | 2017135666 A1 | 8/2017 |

OTHER PUBLICATIONS

Ericsson, "Bearer type switching in dual connectivity", 3GPP TSG-RAN WG2 NR#2, Jun. 27-29, 2017, Tdoc R2-1706572, 6 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0 (Jun. 2017), 745 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.2.1 (Aug. 2017), 43 pages.
Supplementary European Search Report dated May 7, 2020 in connection with European Patent Application No. 18 84 3561, 10 pages.
Supplementary European Search Report dated May 18, 2020 in connection with European Patent Application No. 18 84 2954, 8 pages.
"3rd Genertaion Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 v14.3.0 (Jun. 2017), 330 pages.
Huawei, HiSilicon, "Discussion of procedural specification for bearer type change in DC", 3GPP TSG RAN WG2 Meeting #87bis, Oct. 6-10, 2014, R2-144124, 12 pages.
Vivo, "Layer-2 behaviors of PDCP duplication activation deactivation", 3GPP TSG-RAN WG2 Meeting #99, Aug. 21-25, 2017, R2-1708508, 3 pages.
Huawei, HiSilicon, "PDCP SN Reconfiguration", 3GPP TSG-RAN WG2 Meeting #97bis, Apr. 3-7, 2017, R2-1702587, 6 pages.
Huawei, HiSilicon, "DRB configuration and switch in dual connectivity", 3GPP TSG RAN WG2 Meeting #87, Aug. 18-22, 2014, R2-143343, 5 pages.
Intel Corporation, "RRC Connection Reconfiguration for MR-DC and NR-NR DC", 3GPP TSG-RAN WG2 Meeting #99, Aug. 21-25, 2017, R2-1708831, 7 pages.
Supplementary European Search Report dated Sep. 16, 2020 in connection with European Patent Application No. 18 86 2035, 7 pages.
Notification of Transmittal of the International Search Report and the Written Opinion of the International Searching Authority, or the Declaration dated Nov. 20, 2018 in connection with International Patent Application No. PCT/KR2018/009275, 10 pages.
Notification of Transmittal of the International Search Report and the Written Opinion of the International Searching Authority, or the Declaration dated Jan. 2, 2019 in connection with International Patent Application No. PCT/KR2018/011657, 10 pages.
Office Action dated Nov. 25, 2020 in connection with Korean Patent Application No. 10-2020-7012731, 10 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.8.0 (2017-06), 314 pages.
ZTE, CMCC, "Consideration on the bearer type harmonization", 3GPP TSG RAN WG2 #Nr_AdHoc#2, Jun. 27-29, 2017, R2-1706980, 37 pages.
Huawei, HiSilicon, "Design for harmonized bearer type", 3GPP TSG-RAN WG2 Meeting Ad Hoc, Jun. 27-29, 2017, R2-1707402, 5 pages.
Samsung, "Inter-RAT Mobility for EN-DC", 3GPP TSG-RAN WG2#NR_AdHoc#2 Meeting, Jun. 27-29, 2017, R2-1707089, 4 pages.
Samsung, "Lossless PDCP version change between LTE and NR", 3GPP TSG-RAN WG2 Meeting #99, Aug. 21-25, 2017, R2-1709028, 4 pages.
Notification of Transmittal of the International Search Report and the Written Opinion of the International Searching Authority, or the Declaration dated Nov. 22, 2018 in connection with International Patent Application No. PCT/KR2018/009274, 10 pages.
China National Intellectual Property Administration, "The First Office Action" dated Jun. 25, 2021, in connection with Chinese Patent Application No. 201880052072.7, 24 pages.

* cited by examiner

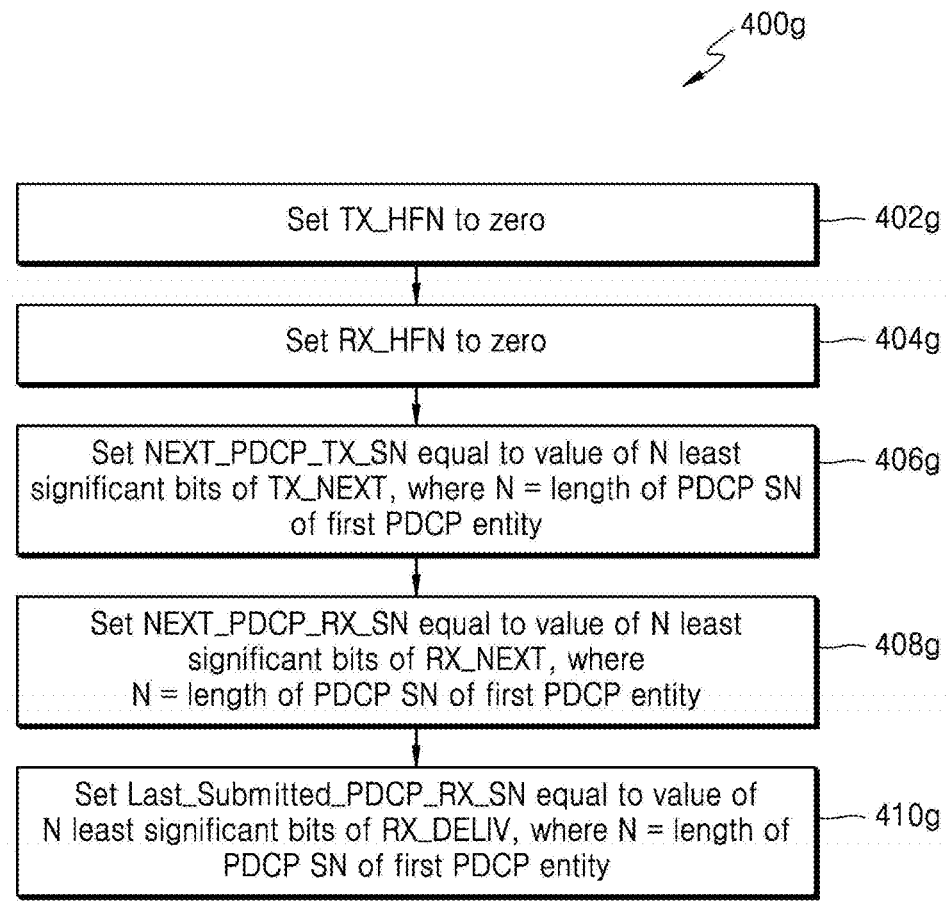

METHOD AND SYSTEM FOR PERFORMING HANDOVER IN WIRELESS COMMUNICATION NETWORK

CROSS-REFERENCE TO RELATED APPLICATIONS

This application is a 371 of International Application No. PCT/KR2018/009274 filed on Aug. 13, 2018, which claims priority to India Patent Application No. 201741028700 filed on Aug. 11, 2017, and India Patent Application No. 201741028700 filed on Aug. 9, 2018, the disclosures of which are herein incorporated by reference in their entirety.

BACKGROUND

1. Field

The present disclosure relates to a wireless communication network. More specifically it is related to a method and system for performing handover in the wireless communication network.

2. Description of Related Art

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication systems, the UE in a connected state communicates with an Enhanced Node B (eNB). A radio protocol stack for communication between the UE and the eNB comprises of Packet Data Convergence Protocol (PDCP), Radio link control (RLC), a Medium Access Control (MAC) and Physical (PHY) sub layers. One or more data radio bearers (DRBs) are established between the UE and the eNB for exchanging user plane packets. Each DRB is associated with one PDCP entity and one or more RLC entities. Each DRB is associated with a logical channel in the MAC sub layer. There is one MAC entity in the UE for the eNB.

The main services and functions of the MAC sublayer include: mapping between logical channels and transport channels, Multiplexing/de-multiplexing of MAC SDUs belonging to one or different logical channels into/from transport blocks (TB) delivered to/from the physical layer on the transport channels, scheduling information reporting, error correction through HARQ, priority handling between the logical channels of one UE, priority handling between the UEs by means of dynamic scheduling, transport format selection and padding.

The main services and functions of the RLC sublayer include: transfer of upper layer PDUs, error correction through ARQ (only for Acknowledged Mode (AM) data transfer), concatenation, segmentation and reassembly of RLC SDUs (only for Un-acknowledgement Mode (UM) and AM data transfer), re-segmentation of the RLC data PDUs (only for the AM data transfer), reordering of the RLC data PDUs (only for the UM and AM data transfer), duplicate detection (only for the UM and AM data transfer), protocol error detection (only for the AM data transfer), the RLC SDU discard (only for the UM and AM data transfer), and RLC re-establishment.

Functions of the RLC sub layer are performed by the RLC entities. The RLC entity can be configured to perform the data transfer in one of the following three modes: Transparent Mode (TM), Unacknowledged Mode (UM), and Acknowledged Mode (AM). Consequently, the RLC entity is categorized as a TM RLC entity, an UM RLC entity and an AM RLC entity depending on the mode of data transfer that the RLC entity is configured to provide. The TM RLC entity is configured either as a transmitting TM RLC entity or a receiving TM RLC entity. The transmitting TM RLC entity receives RLC SDUs from an upper layer (i.e. PDCP) and sends RLC PDUs to its peer receiving the TM RLC entity via lower layers (i.e. MAC). The receiving TM RLC entity delivers the RLC SDUs to the upper layer (i.e. PDCP) and receives the RLC PDUs from its peer transmitting the TM RLC entity via the lower layers (i.e. MAC).

Further, the UM RLC entity is configured either as a transmitting UM RLC entity or a receiving UM RLC entity. The transmitting UM RLC entity receives the RLC SDUs from the upper layer and sends the RLC PDUs to its peer receiving UM RLC entity via the lower layers. The receiving UM RLC entity delivers the RLC SDUs to the upper layer and receives the RLC PDUs from its peer transmitting the UM RLC entity via the lower layers. The AM RLC entity consists of a transmitting side and a receiving side. The transmitting side of the AM RLC entity receives the RLC SDUs from the upper layer and sends the RLC PDUs to its peer AM RLC entity via the lower layers. The receiving side of the AM RLC entity delivers the RLC SDUs to the upper layer and receives the RLC PDUs from its peer AM RLC entity via the lower layers.

The main services and functions of the PDCP sublayer for the user plane include: header compression and decompression: ROHC only, transfer of user data, in-sequence delivery of the upper layer PDUs at PDCP re-establishment procedure for RLC AM, For split bearers in the DC (only support for the RLC AM): PDCP PDU routing for transmission and PDCP PDU reordering for reception, duplicate detection of the lower layer SDUs at the PDCP re-establishment procedure for the RLC AM, retransmission of the PDCP SDUs at handover and, for split bearers in DC, of PDCP PDUs at PDCP data-recovery procedure, for RLC AM, ciphering and deciphering, and timer-based SDU discard in an uplink (UL). Functions of the PDCP sub layer are performed by the PDCP entities. Each PDCP entity carries the data of one radio bearer. Due to the UE mobility, the UE may handover from one eNB to another eNB. In dual connectivity (DC) mode of operation due to UE mobility the UE may handover from one MeNB to another MeNB or SCG change from one SeNB to another SeNB. The eNB may support multiple cells and the UE may also handover from one cell to another cell of same eNB.

In the fourth generation wireless communication system like LTE, the X2 based handover between two enhanced node B (eNBs) or base station for AM data radio bearers (DRBs) is lossless.

After the handover, the user plane protocols for the DRBs configured with the RLC layer in the AM mode are handled as follows in a legacy system: a PDCP SN is maintained on a bearer basis; a source eNB informs the target eNB about the next DL PDCP SN to allocate to a packet which does not have a PDCP sequence number yet (either from the source eNB or from a serving gateway); For security synchronisation, a Hyper Frame Number (HFN) is also maintained; the source eNB provides to the target one reference HFN for the UL and one for the DL i.e., HFN and corresponding SN; Security keys are refreshed; the UE sends PDCP status report to the target eNB if the PDCP status report is configured by the target eNB. The configuration to send status report is per bearer; the target eNB may send the PDCP status report to the UE and the UE does not need to wait to resume UL transmission; the UE re-transmits in the target eNB or the target cell, all uplink PDCP SDUs starting from the first PDCP SDU following the last consecutively confirmed PDCP SDU i.e., the oldest PDCP SDU that has not been acknowledged at the RLC in the source, excluding the PDCP SDUs of which the reception is acknowledged through the PDCP SN based reporting by the target eNB. The target eNB re-transmits and prioritizes all downlink PDCP SDUs forwarded by the source eNB (i.e., the target eNB should send data with the PDCP SNs from X2 before sending data from S1), with the exception of the PDCP SDUs of which the reception is acknowledged through the PDCP SN based reporting by the UE; the ROHC is reset; and the RLC/MAC is reset. The PDCP PDUs stored in the PDU reordering buffer are deciphered and decompressed and kept in the PDCP, associated with COUNT.

Alternately, after the handover the user plane protocols for DRBs configured with RLC in the UM mode are handled as follows in legacy system: the PDCP SN is reset; the HFN is reset; the security keys are refreshed; No PDCP status report is transmitted; No PDCP SDUs are retransmitted in the target eNB; The UE PDCP entity does not attempt to retransmit any PDCP SDU in the target cell for which transmission had been completed in the source cell. Instead UE PDCP entity starts the transmission with other PDCP SDUs; ROHC is reset; and RLC/MAC is reset. The user plane protocol of LTE from UE perspective is shown in FIG. 1A.

In the fifth generation wireless communication system, the concept of QoS flows replacing the EPS bearer concept in the core network is introduced. This means the user plane between the gNB and the gateway is based on the QoS flow instead of the S1-U bearer in the LTE system. For the particular UE, there can be one or more QoS flows between the gNB and the data gateway depending on the characteristics of the application/service and the QoS handling of the traffic. The EPS bearer handles all the user packets mapped to the EPS bearer with the same QoS. Within the EPS bearer, there is no further differentiated handling of the user plane packets. The QoS flow concept of the 5G system overcomes this drawback of the EPS bearer concept of the LTE system. The packets mapped to the different QoS flows belonging to the UE traffic can be handled differently. To achieve the same differentiated handling in the LTE system, multiple EPS bearers with different QoS parameters need to be created. In the 5G system, all the different QoS flows of the UE are handled by the PDU session between the g/NB and the data gateway. The UE may have more than one PDU session depending on the number of the PDN connections. However, for one PDN connection one PDU session is created. At high level, the PDU session can be analogous with the EPS bearer in the LTE system.

However, on the radio interface, the 5G system has retained the data radio bearer (DRB) concept for user plane handling. This requires that the one or more QoS flows belonging to the PDU session of the UE is mapped to the DRB depending on the QoS requirement. The mapping of the QoS flow to the DRB is done in the RAN node i.e. the gNB within the new user plane protocol layer called SDAP (Service Data Adaptation Protocol) layer which is placed above the PDCP. The SDAP entities are located in the SDAP sublayer. Several SDAP entities may be defined for the UE. There is one SDAP entity configured per cell group for each individual PDU session. The SDAP entity in the SDAP sublayer performs mapping between the QoS flow and the data radio bearer for both the DL and the UL. The user plane protocol of 5G from UE perspective is shown in FIG. 1B respectively.

Multi-RAT Dual Connectivity (MR-DC) is a generalization of the Intra-E-UTRA Dual Connectivity (DC) described in 3GPP TS 36.300, where a multiple Rx/Tx UE may be configured to utilize radio resources provided by two distinct schedulers in two different nodes connected via non-ideal backhaul, one providing E-UTRA access and the other one providing NR access. One scheduler is located in the master node (MN) and the other in the secondary (SN). The MN and SN are connected via a network interface and at least the MN is connected to the core network.

As described in 3GPP TS 37.340, E-UTRAN supports MR-DC via E-UTRA-NR Dual Connectivity (EN-DC), in which a UE is connected to one LTE eNB that acts as a MN and one NR gNB that acts as a SN as shown in FIG. 2A. The MN i.e. LTE eNB is connected to the EPC and the SN i.e. NR gNB is connected to the MN i.e. LTE eNB via the X2 interface.

NG-RAN supports NG-RAN E-UTRA-NR Dual Connectivity (NGEN-DC), in which a UE is connected to one LTE ng-eNB that acts as a MN and one NR gNB that acts as a SN as shown in FIG. 2B. The LTE ng-eNB is connected to the 5G-Core (5G-CN) and the NR gNB is connected to the MN i.e. LTE ng-eNB via the Xn interface. The LTE ng-eNB is also referred as eLTE eNB.

NG-RAN supports NR-E-UTRA Dual Connectivity (NE-DC), in which a UE is connected to one NR gNB that acts as a MN and one LTE ng-eNB that acts as a SN as shown in FIG. 2C. The NR gNB is connected to the 5G-Core and the LTE ng-eNB is connected to the MN i.e. NR gNB via the Xn interface.

NG-RAN supports also NR-NR Dual Connectivity (NR-NR DC), in which a UE is connected to one NR gNB that acts as a MN and another NR gNB that acts as a SN as shown in FIG. 2D. NG-RAN supports NR-E-UTRA Dual Connectivity (NE-DC), in which a UE is connected to one NR gNB that acts as a MN and one LTE ng-eNB that acts as a SN In MR-DC, the radio protocol architecture that a particular radio bearer uses depends on how the radio bearer is setup. Four bearer types exist: MCG bearer, MCG split bearer, SCG bearer and SCG split bearer. These four bearer types are depicted in the FIG. 3A and FIG. 3B assuming the NR user plane protocol stack. The MCG bearer is a MN terminated bearer having the associated PDCP entity anchored in the MN. The lower part of Layer 2 configuration associated with RLC entity and MAC entity for the MCG bearer can be configured either in the MN or SN. The SCG bearer is a SN terminated bearer having the associated PDCP entity anchored in the SN. The lower part of Layer 2 configuration associated with RLC entity and MAC entity for the SCG bearer can be configured either in the MN or SN. The MCG Split bearer is a MN terminated bearer having the associated PDCP entity anchored in the MN. The lower part of Layer 2 configuration associated with RLC entity and MAC entity for the MCG Split bearer can be configured in both the MN and SN. The SCG Split bearer is a SN terminated bearer having the associated PDCP entity anchored in the SN. The lower part of Layer 2 configuration associated with RLC entity and MAC entity for the SCG Split bearer can be configured in both the MN and SN. In the FIGS. 3A and 3B when the LTE eNB is MN and connected EPC i.e. EN-DC (as depicted in FIG. 2A), the SDAP layer is not present in the user plane protocol stack. The MCG bearer or MN terminated bearer can be configured with either LTE PDCP or NR PDCP while the MCG Split bearer i.e. MN terminated Split bearer, the SCG Split bearer i.e. SN terminated Split bearer and SCG bearer i.e. SN terminated bearer is configured with NR PDCP. However when the eLTE eNB (i.e. LTE ng-eNB) is MN and connected to 5G-CN i.e. NGEN-DC (as depicted in FIG. 2B), then the SDAP layer protocol stack is present in FIGS. 3A and 3B. The MCG bearer i.e. MN terminated bearer, the MCG Split bearer, SCG Split bearer and SCG bearer is configured with NR PDCP in NGEN-DC configuration.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method and system for performing a handover in a wireless communication network.

Another object of the embodiments herein is to perform a Packet Data Convergence Protocol (PDCP) version change by a network for one or more radio bearers to switch from a first PDCP entity to a second PDCP entity.

Another object of the embodiments herein is to receive at least one of a Packet Data Convergence Protocol (PDCP) version change indication and security key change indication by a User Equipment (UE) in a handover command (i.e., a Radio Resource Control (RRC) Reconfiguration message) from the network.

Another object of the embodiments herein is to perform a PDCP version change by the UE to switch from the first PDCP entity to the second PDCP entity for a configured radio bearer in response to receiving the PDCP version change indication and refreshing the security key associated with the configured radio bearer in response to receiving the security key change indication.

Another object of the embodiments herein is to perform a PDCP version change by the network and UE to switch from the first PDCP entity associated with the configured radio bearer to the second PDCP entity by releasing the concerned radio bearer with first PDCP entity and adding the radio bearer with second PDCP entity and refreshing the security key associated with the concerned radio bearer.

Another object of the embodiments herein is to determine by the network whether a sequence number (SN) length of a first PDCP entity associated with concerned radio bearer configured by a source node is less than or equal to a SN length of a second PDCP entity configured by the target node for performing a lossless PDCP version change during the handover.

Another object of the embodiments herein is to perform a lossless PDCP version change to switch from the first PDCP entity to the second PDCP entity using a PDCP re-establishment procedure by the network and the UE.

Another object of the embodiments herein is to derive a second set of state variables associated with the second PDCP entity from the first set of state variables in response to receiving the PDCP version change indication.

Another object of the embodiments herein is to provide a method and system for PDCP version change i.e., from a LTE PDCP to NR PDCP during one of the inter-RAT and intra-RAT handover.

Another object of the embodiments herein is to provide a method and system for PDCP version change i.e., from a NR PDCP to a LTE PDCP during one of the inter-RAT and intra-RAT handover.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 4G is a flow chart illustrating various steps involved in performing a PDCP version change from a NR PDCP entity to a LTE PDCP entity during the handover, according to an embodiment as disclosed herein;

DETAILED DESCRIPTION

Figure 1A:
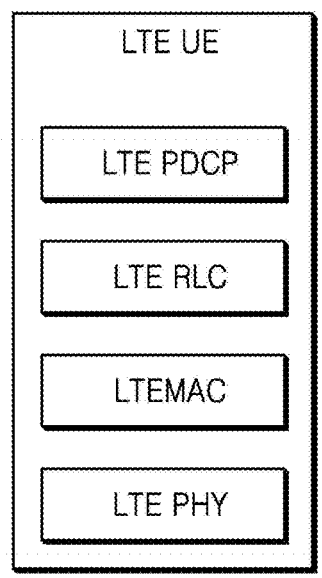
FIG. 1A illustrates Long Term Evolution (LTE) user plane protocol stack, according to a prior art.
Figure 1B:
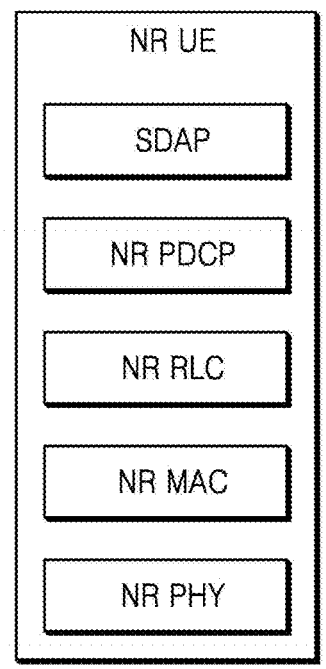
FIG. 1B illustrates New Radio (NR) user plane protocol stack, according to a prior art.
Figure 2A:
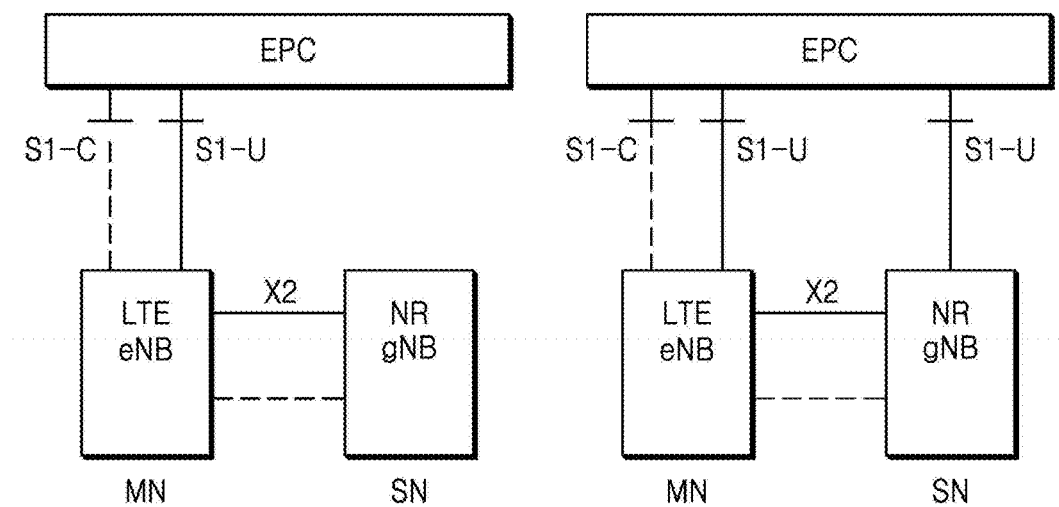
FIG. 2A illustrates an EN-DC architecture, according to a prior art.
Figure 2B:
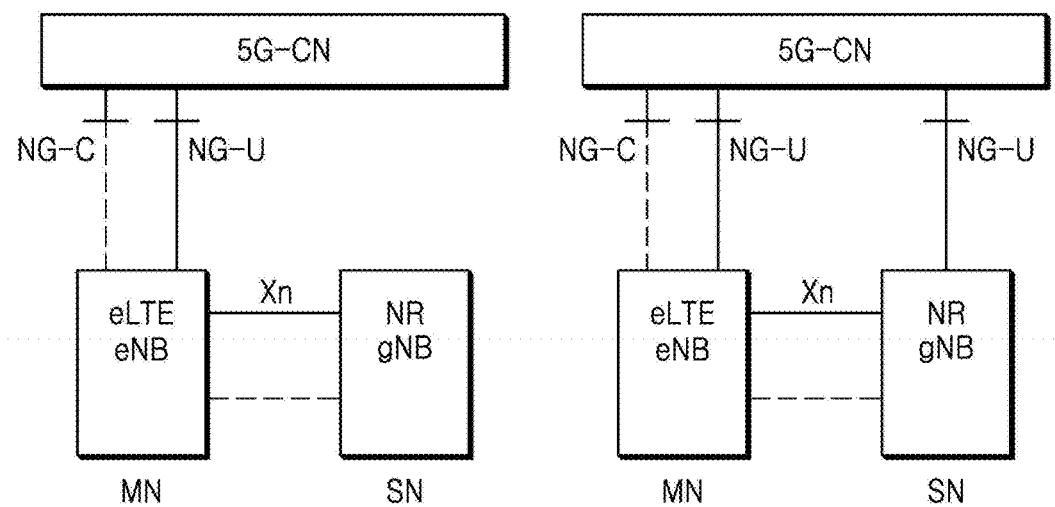
FIG. 2B illustrates a NGEN-DC architecture, according to a prior art.
Figure 2C:
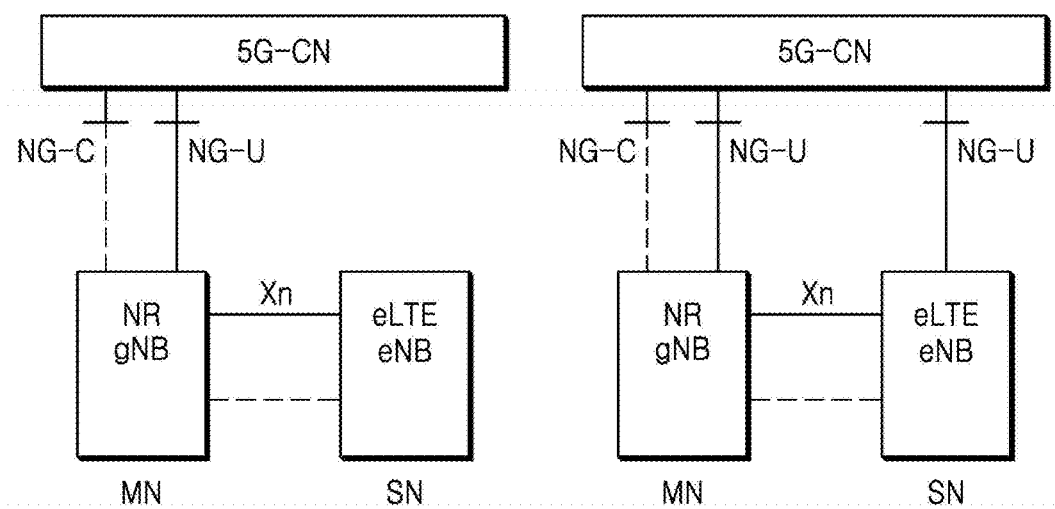
FIG. 2C illustrates a NE-DC architecture, according to a prior art.
Figure 2D:
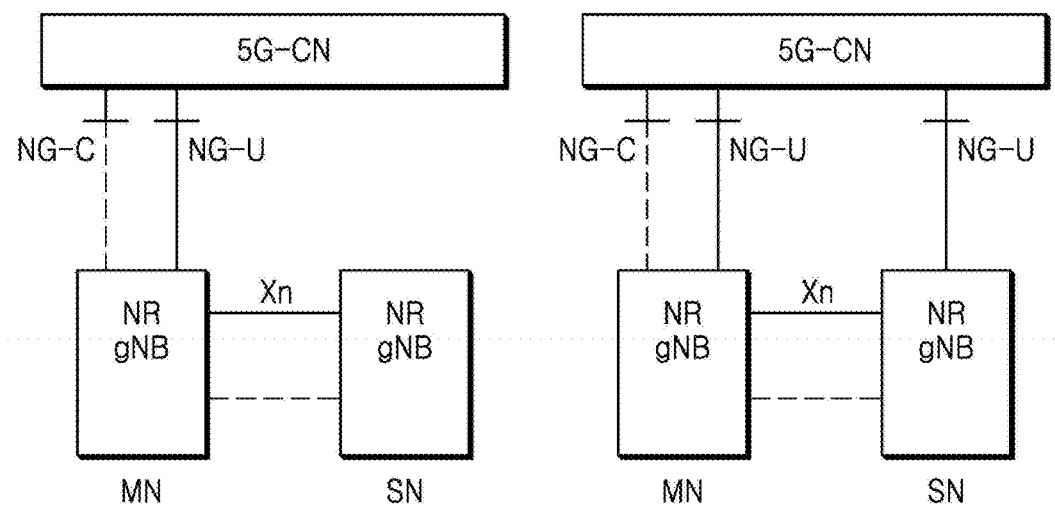
FIG. 2D illustrates a NR-NR DC architecture, according to a prior art.
Figure 3A:
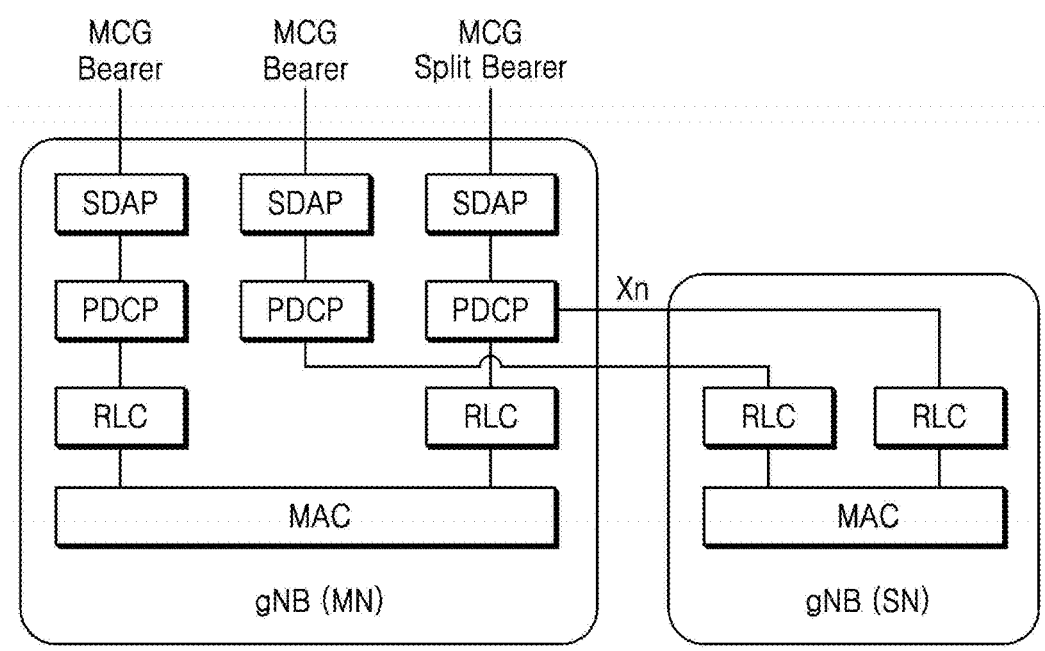
FIG. 3A illustrates a MCG and MCG split bearer architecture, according to a prior art.
Figure 3B:
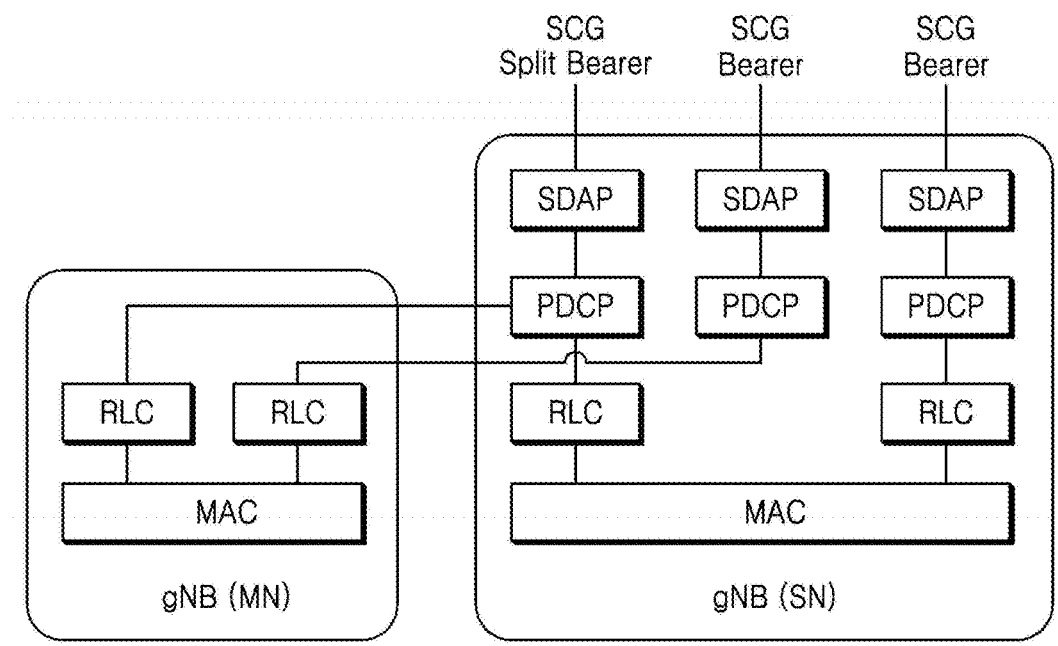
FIG. 3B illustrates SCG and SCG split bearer architecture, according to a prior art.

Accordingly the embodiments herein provide a method for performing a handover in a wireless communication network (network). The method includes performing, by a network, a Packet Data Convergence Protocol (PDCP) version change for one or more radio bearers to switch from a first PDCP entity to a second PDCP entity. Further, the method includes receiving, by a User Equipment (UE), at least one of a PDCP version change indication and security key change indication from the network. Furthermore, the method includes performing, by the UE, a PDCP version change to switch from the first PDCP entity to the second PDCP entity for a configured radio bearer in response to receiving the PDCP version change indication and refreshing the security key associated with the configured radio bearer in response to receiving the security key change indication.

In an embodiment, performing the PDCP version change by the network to switch from the first PDCP entity associated with the configured radio bearer to the second PDCP entity involves releasing the concerned radio bearer with first PDCP entity and adding the radio bearer with second PDCP entity and refreshing the security key associated with the concerned bearer.

In an embodiment, performing the PDCP version change by the UE to switch from the first PDCP entity to the second PDCP entity for a configured radio bearer in response to receiving the PDCP version change indication comprises releasing the concerned radio bearer with first PDCP entity and adding the radio bearer with second PDCP entity and refreshing the security key associated with the concerned radio bearer in response to receiving the security key change indication.

In an embodiment, deriving the second set of state variables from the first set of state variables includes:
  setting the TX_NEXT equal to NEXT_PDCP_TX_SN;
  setting the RX_NEXT equal to NEXT_PDCP_RX_SN; and
  setting the RX_DELIV equal to Last_Submitted_PDCP_RX_SN.

In an embodiment, the second set of state variables is derived from the first set of state variables in which:
  TX_NEXT is calculated as a sum of NEXT_PDCP_TX_SN and twice length of LTE PDCP SN multiplied by the TX_HFN;
  RX_NEXT is calculated as a sum of NEXT_PDCP_RX_SN and twice length of LTE PDCP SN multiplied by the RX_HFN; and
  RX_DELIV is calculated as a sum of Last_Submitted_PDCP_RX_SN and twice length of LTE PDCP SN multiplied by the RX_HFN.

In an embodiment, the RX_REORD is calculated based on the RX_NEXT of the first packet received from lower layers.

In an embodiment, deriving the second set of state variables from the first set of state variables includes:
  setting the TX_HFN to zero;
  setting the RX_HFN to zero;
  setting the NEXT_PDCP_TX_SN equal to value of least significant bits of TX_NEXT, wherein the number of least significant bits of TX_NEXT is equal to the length of PDCP SN of first PDCP entity;
  setting the NEXT_PDCP_RX_SN equal to value of least significant bits of RX_NEXT, wherein the number of least significant bits of RX_NEXT is equal to the length of PDCP SN of first PDCP entity; and
  setting the Last_Submitted_PDCP_RX_SN equal to value of least significant bits of RX_DELIV; wherein the length of the least significant bits of RX_DELIV is equal to the length of PDCP SN of first PDCP entity.

In an embodiment, deriving the second set of state variables from the first set of state variables includes:
  setting the TX_HFN equal to most significant bits of TX_NEXT wherein the number of most significant bits of TX_NEXT is equal to the length of HFN in second PDCP entity;
  setting the RX_HFN equal to most significant bits of RX_NEXT wherein the number of most significant bits of RX_NEXT is equal to the length of HFN in second PDCP entity;
  setting the NEXT_PDCP_TX_SN equal to value of least significant bits of TX_NEXT, wherein the number of least significant bits of TX_NEXT is equal to the length of PDCP SN of second PDCP entity;
  setting the NEXT_PDCP_RX_SN equal to value of least significant bits of RX_NEXT, wherein the number of least significant bits of RX_NEXT is equal to the length of PDCP SN of second PDCP entity; and
  setting the Last_Submitted_PDCP_RX_SN equal to value of least significant bits of RX_DELIV; wherein the length of the least significant bits of RX_DELIV is equal to the length of PDCP SN of second PDCP entity.

In an embodiment, an update of PDCP SN of each PDCP SDU at the second PDCP entity which has undergone the PDCP version change includes calculating the PDCP SN of each PDCP SDU by considering the least significant bits of the Count Value associated with the PDCP SDU at the first PDCP entity, wherein the length of least significant bits of COUNT value is equal to the length of PDCP SN at the second PDCP entity.

Accordingly, the embodiments herein provide a User Equipment (UE) for performing a handover in a wireless communication network. The UE is configured to receive at least one of a PDCP version change indication and security key change indication from the network. Further, the UE is configured to perform a PDCP version change to switch from a first PDCP entity to a second PDCP entity for a configured radio bearer in response to receiving the PDCP version change indication and refresh the security key associated with the concerned radio bearer in response to receiving the security key change indication.

In an embodiment, the version of first PDCP entity and the version of second PDCP entity is one of a LTE PDCP and a NR PDCP, wherein the version of first PDCP entity and second PDCP entity is not the same.

In an embodiment, the received PDCP version change indication commands the UE to switch from one of a LTE PDCP version to a NR PDCP version and a NR PDCP version to a LTE PDCP version for the configured radio bearer.

In an embodiment, the received security key change indication commands the UE to refresh the security key associated with the configured radio bearer.

In an embodiment, the received PDCP version change indication, the received security key change indication is one of explicit indication(s) and an implicit indication comprising a PDCP configuration associated with the second PDCP entity.

In an embodiment, the UE is configured to receive the PDCP version change indication and security key change indication in a handover command such as the Radio Resource Control (RRC) Reconfiguration message to perform a handover from a source node to a target node.

In an embodiment, the configured radio bearer is at least one of a Signaling Radio Bearer (SRB) except SRB0 and a Data Radio Bearer (DRB).

In an embodiment, the UE is configured to perform an inter RAT handover involving a source node type and a target node type which is one of an LTE evolved Node base station (eNB) and an E-UTRA-NR Dual Connectivity (EN-DC) capable LTE eNB, wherein the UE is an EN-DC capable UE and the type of the source node and the target node is not the same.

In an embodiment, the UE is configured to perform an intra-RAT handover involving same type of source node and target node such as EN-DC capable LTE eNB, wherein the UE is an EN-DC capable UE.

In an embodiment, the UE is configured to perform the PDCP version change to switch from the first PDCP entity to the second PDCP entity for the configured radio bearer, wherein the performing the PDCP version change involves releasing the concerned radio bearer with first PDCP entity and adding the radio bearer with second PDCP entity in response to receiving the PDCP version change indication, and refreshing the security key associated with the concerned radio bearer in response to receiving the security key change indication.

In an embodiment, the UE is configured to perform the PDCP version change in lossless manner to switch from the first PDCP entity to the second PDCP entity for the configured radio bearer wherein the performing the PDCP version change involves performing the PDCP re-establishment in response to receiving the PDCP version change indication, and refreshing the security key for the configured radio bearer in response to receiving the security key change indication.

In an embodiment, when the first PDCP entity is the LTE PDCP entity and the second PDCP entity is the NR PDCP entity, the UE is configured to perform the PDCP version change and the PDCP re-establishment by: deriving a second set of state variables associated with second PDCP entity from a first set of state variables associated with first PDCP entity by: calculating values of the second set of state variables representing TX_NEXT, RX_NEXT, RX_DELIV and RX_REORD, associated with the NR PDCP entity using the first set of state variables representing NEXT_PDCP_TX_SN, TX_HFN, NEXT_PDCP_RX_SN, RX_HFN, Last_Submitted_PDCP_RX_SN and Reordering_PDCP_RX_COUNT associated with the LTE PDCP entity, and updating the PDCP SN of each PDCP SDU which has undergone PDCP version change.

In an embodiment, the UE is configured to derive the second set of state variables from the first set of state variables by: setting the TX_NEXT equal to NEXT_PDCP_TX_SN, setting the RX_NEXT equal to NEXT_PDCP_RX_SN, and setting the RX_DELIV equal to Last_Submitted_PDCP_RX_SN.

In an embodiment, the UE is configured to derive the second set of state variables from the first set of state variables in which: TX_NEXT is calculated as a sum of NEXT_PDCP_TX_SN and twice length of LTE PDCP SN multiplied by the TX_HFN; RX_NEXT is calculated as a sum of NEXT_PDCP_RX_SN and twice length of LTE PDCP SN multiplied by the RX_HFN; and RX_DELIV is calculated as a sum of Last_Submitted_PDCP_RX_SN and twice length of LTE PDCP SN multiplied by the RX_HFN.

In an embodiment, the UE configured to calculate the RX_REORD based on the RX_NEXT of the first packet received from lower layers.

In an embodiment, when the when the first PDCP entity is the NR PDCP entity and the second PDCP entity is the LTE PDCP entity, the UE is configured to perform the PDCP version change and PDCP re-establishment by: deriving a second set of state variables associated with second PDCP entity from a first set of state variables associated with first PDCP entity by: calculating values of the second set of state variables representing NEXT_PDCP_TX_SN, TX_HFN, NEXT_PDCP_RX_SN, RX_HFN and Last_Submitted_PDCP_RX_SN associated with the LTE PDCP entity using the first set of state variables representing TX_NEXT, RX_NEXT, RX_DELIV and RX_REORD, associated with the NR PDCP entity; and updating the PDCP SN of each PDCP SDU which has undergone PDCP version change.

In an embodiment, the UE is configured to derive the second set of state variables from the first set of state variables by: setting the TX_HFN to zero; setting the RX_HFN to zero; setting the NEXT_PDCP_TX_SN equal to value of least significant bits of TX_NEXT, wherein the number of least significant bits of TX_NEXT is equal to the length of PDCP SN of first PDCP entity; setting the NEXT_PDCP_RX_SN equal to value of least significant bits of RX_NEXT, wherein the number of least significant bits of RX_NEXT is equal to the length of PDCP SN of first PDCP entity; and setting the Last_Submitted_PDCP_RX_SN equal to value of least significant bits of RX_DELIV, wherein the length of the least significant bits of RX_DELIV is equal to the length of PDCP SN of first PDCP entity.

In an embodiment, the UE is configured to derive the second set of state variables from the first set of state variables by: setting the TX_HFN equal to most significant bits of TX_NEXT wherein the number of most significant bits of TX_NEXT is equal to the length of HFN in second PDCP entity; setting the RX_HFN equal to most significant bits of RX_NEXT wherein the number of most significant bits of RX_NEXT is equal to the length of HFN in second PDCP entity; setting the NEXT_PDCP_TX_SN equal to value of least significant bits of TX_NEXT, wherein the number of least significant bits of TX_NEXT is equal to the length of PDCP SN of second PDCP entity; setting the NEXT_PDCP_RX_SN equal to value of least significant bits of RX_NEXT, wherein the number of least significant bits of RX_NEXT is equal to the length of PDCP SN of second PDCP entity; and setting the Last_Submitted_PDCP_RX_SN equal to value of least significant bits of RX_DELIV; wherein the length of the least significant bits of RX_DELIV is equal to the length of PDCP SN of second PDCP entity.

In an embodiment, the UE is configured to update PDCP SN of each PDCP SDU at the second PDCP entity which has undergone the PDCP version change by: calculating the PDCP SN of each PDCP SDU is calculated by considering the least significant bits of the Count Value associated with the PDCP SDU at the first PDCP entity; wherein the length of least significant bits of COUNT value is equal to the length of PDCP SN at the second PDCP entity.

Accordingly the embodiments herein provide a wireless communication network (network) for performing a handover for a User Equipment (UE). The network is configured to perform a PDCP version change for one or more radio bearers to switch from a first PDCP entity to a second PDCP entity. Further, the network is configured to send at least one of a PDCP version change indication and security key change indication to the UE.

In an embodiment, the network is configured to perform a PDCP version change in a lossless manner from the first PDCP entity to the second PDCP entity for one or more configured radio bearers includes determining whether a sequence number (SN) length of the first PDCP entity associated with the radio bearer configured by a source node is less than or equal to a SN length of a second PDCP entity configured by a target node. Further, the method includes transferring, by a source node, a first set of state variables associated with first PDCP entity to the target node. Furthermore, the method includes performing the PDCP re-establishment for the configured radio bearer and refreshing the security key associated with the configured radio bearer.

In an embodiment, the version of first PDCP entity and the version of second PDCP entity is one of a LTE PDCP and a NR PDCP, wherein the version of first PDCP entity and second PDCP entity is not the same.

In an embodiment, the PDCP version change indication sent to the UE is one of an explicit indication and an implicit indication comprising the PDCP configuration associated with the second PDCP entity.

In an embodiment, the network is configured to send the PDCP version change indication and the security key change indication to the UE in a handover command such as a Radio Resource Control (RRC) Reconfiguration message to perform a handover from a source node to a target node.

In an embodiment, the one or more radio bearers is at least one of a Signaling Radio Bearer (SRB) except SRB0 and a Data Radio Bearer (DRB).

In an embodiment, the handover is an inter-RAT handover involving a source node type and the target node type which is one of an LTE evolved Node base station (eNB) and an E-UTRA-NR Dual Connectivity (EN-DC) capable LTE eNB such that the type of the source node and the target node is not the same and the UE is a EN-DC capable UE.

In an embodiment, the handover is an intra-RAT handover involving same type of source node and target node such as EN-DC capable LTE eNB and the UE is a EN-DC capable UE.

In an embodiment, the network is configured to perform the PDCP version change to switch from the first PDCP entity associated with the one or more radio bearers to the second PDCP entity by: releasing the radio bearer with the first PDCP entity and adding the radio bearer with second PDCP entity; and refreshing the security key associated with the concerned radio bearer.

In an embodiment, the network is configured to perform a PDCP version change in a lossless manner from the first PDCP entity to the second PDCP entity for one or more configured radio bearers by: determining whether a sequence number (SN) length of the first PDCP entity associated with the radio bearer configured by a source node is less than or equal to a SN length of a second PDCP entity configured by a target node; transferring, by a source node, a first set of state variables associated with first PDCP entity to the target node; performing a PDCP re-establishment for the configured radio bearer; and refreshing the security key associated with the configured radio bearer.

In an embodiment, when the first PDCP entity is a LTE PDCP entity and the second PDCP entity is a NR PDCP entity, the network is configured to perform the PDCP version change and the PDCP re-establishment procedure by: deriving a second set of state variables associated with second PDCP entity from a first set of state variables associated with first PDCP entity by: calculating values of the second set of state variables representing TX_NEXT, RX_NEXT, RX_DELIV and RX_REORD, associated with the NR PDCP entity using the first set of state variables representing NEXT_PDCP_TX_SN, TX_HFN, NEXT_PDCP_RX_SN, RX_HFN, Last_Submitted_PDCP_RX_SN and Reordering_PDCP_RX_COUNT associated with the LTE PDCP entity; and updating the PDCP SN of each PDCP SDU which has undergone version change.

In an embodiment, the network is configured to derive configured to derive the second set of state variables from the first set of state variables by: setting the TX_NEXT equal to NEXT_PDCP_TX_SN; setting the RX_NEXT equal to NEXT_PDCP_RX_SN; and setting the RX_DELIV equal to Last_Submitted_PDCP_RX_SN.

In an embodiment, the network is configured to derive configured to derive the second set of state variables from the first set of state in which: TX_NEXT is calculated as a sum of NEXT_PDCP_TX_SN and twice length of LTE PDCP SN multiplied by the TX_HFN; RX_NEXT is calculated as a sum of NEXT_PDCP_RX_SN and twice length of LTE PDCP SN multiplied by the RX_HFN; and RX_DELIV is calculated as a sum of Last_Submitted_PDCP_RX_SN and twice length of LTE PDCP SN multiplied by the RX_HFN.

In an embodiment, the network is configured to calculate the RX_REORD based on the RX_NEXT of the first packet received from lower layers.

In an embodiment, when the first PDCP entity is the NR PDCP entity and the second PDCP entity is the LTE PDCP entity, the PDCP version change and PDCP re-establishment by: deriving a second set of state variables associated with second PDCP entity from a first set of state variables associated with first PDCP entity by: calculating values of the second set of state variables representing NEXT_PDCP_TX_SN, TX_HFN, NEXT_PDCP_RX_SN, RX_HFN and Last_Submitted_PDCP_RX_SN associated with the LTE PDCP entity using the first set of state variables representing TX_NEXT, RX_NEXT, RX_DELIV and RX_REORD, associated with the NR PDCP entity; and updating the PDCP SN of each PDCP SDU which has undergone PDCP version change.

In an embodiment, the network is configured to derive the second set of state variables from the first set of state variables by: setting the TX_HFN to zero; setting the RX_HFN to zero; setting the NEXT_PDCP_TX_SN equal to value of least significant bits of TX_NEXT, wherein the number of least significant bits of TX_NEXT is equal to the length of PDCP SN of first PDCP entity; setting the NEXT_PDCP_RX_SN equal to value of least significant bits of RX_NEXT, wherein the number of least significant bits of RX_NEXT is equal to the length of PDCP SN of first PDCP entity; and setting the Last_Submitted_PDCP_RX_SN equal to value of least significant bits of RX_DELIV, wherein the length of the least significant bits of RX_DELIV is equal to the length of PDCP SN of first PDCP entity.

In an embodiment, the network is configured to derive the second set of state variables from the first set of state variables by: setting the TX_HFN equal to most significant bits of TX_NEXT wherein the number of most significant bits of TX_NEXT is equal to the length of HFN in second PDCP entity; setting the RX_HFN equal to most significant bits of RX_NEXT wherein the number of most significant bits of RX_NEXT is equal to the length of HFN in second PDCP entity; setting the NEXT_PDCP_TX_SN equal to value of least significant bits of TX_NEXT, wherein the number of least significant bits of TX_NEXT is equal to the length of PDCP SN of second PDCP entity; setting the NEXT_PDCP_RX_SN equal to value of least significant bits of RX_NEXT, wherein the number of least significant bits of RX_NEXT is equal to the length of PDCP SN of second PDCP entity; and setting the Last_Submitted_PDCP_RX_SN equal to value of least significant bits of RX_DELIV; wherein the length of the least significant bits of RX_DELIV is equal to the length of PDCP SN of second PDCP entity.

In an embodiment, the network node is configured to update PDCP SN of each PDCP SDU at the second PDCP entity which has undergone the PDCP version change by: calculating the PDCP SN of each PDCP SDU is calculated by considering the least significant bits of the Count Value associated with the PDCP SDU at the first PDCP entity, wherein the length of least significant bits of COUNT value is equal to the length of PDCP SN at the second PDCP entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the description, the terms source node and source base station will have the same meaning. Further, the terms target node and target base station will have the same meaning.

Prior to describing the various embodiments of the present disclosure, the following information is presented herein for better understanding of the various embodiments.

a. Inter RAT handover can cause PDCP version change in below cases

When EN-DC capable UE moves from legacy LTE to Rel-15 LTE node for EN-DC operation i.e., PDCP entity associated with MCG bearer can undergo PDCP version change when such bearer configured with LTE PDCP is not carrying VOIP packets to NR PDCP when the EN-DC capable UE moves in Rel-15 EN-DC capable LTE eNB.

When EN-DC capable UE moves from Rel-15 LTE node for EN-DC operation to legacy LTE eNB. In this case PDCP entity associated with MCG bearer can undergo PDCP version change when such bearer configured with NR PDCP to LTE PDCP when the EN-DC capable UE moves in legacy LTE eNB.

b. PDCP version change during MR-DC operation:

During MR-DC operation, NW can configure the MCG bearer i.e. MN terminated bearer either with LTE PDCP or NR PDCP. Based on NW deployment or requirements it can change the PDCP version for MCG bearer between NR PDCP or LTE PDCP. One such case is for bearer type changes, if MCG DRB is configured with NR PDCP, then direct change between the bearer types can be supported without any complexity or restriction. If MCG DRB is configured as LTE PDCP then there can be impact on bearer type change as direct change between the bearer types eg. MCG to SCG bearer or MCG to/from Split bearer need some additional restriction to support lossless transition.

All the above mentioned scenarios can be supported through handover procedure as it involves PDCP version change and security key change which requires PDCP re-establishment. The LTE PDCP and the NR PDCP even though quite similar in terms of functionality, there are still some differences in terms of e.g. supported PDCP SN size (length), state variables, reordering functionality, PDCP PDU size etc. To support lossless PDCP version change in either direction few restrictions are required to achieve PDCP version change with the PDCP re-establishment procedure which does not result in data loss.

NR PDCP procedures and state variables are based on COUNT value instead of sequence number (SN). The COUNT value is composed of a HFN and the PDCP SN. The size (length) of the HFN part in bits is equal to 32 minus the length of the PDCP SN. The SN supported in NR is 12 and 18 bit. All NR PDCP state variables are based on COUNT.

a) TX_NEXT

This state variable indicates the COUNT value of the next PDCP SDU to be transmitted. The initial value is 0. The receiving PDCP entity shall maintain the following state variables:

b) RX_NEXT

This state variable indicates the COUNT value of the next PDCP SDU expected to be received. The initial value is 0.

c) RX_DELIV

This state variable indicates the COUNT value of the last PDCP SDU delivered to the upper layers. The initial value is $2^{32}$ d) RX_REORD This state variable indicates the COUNT value following the COUNT value associated with the PDCP Data PDU which triggered t-Reordering.

LTE PDCP procedures and state variables are based on PDCP SN and HFN. In LTE for ciphering and integrity a COUNT value is maintained. The COUNT value is composed of a HFN and the PDCP SN. The size (length) of the PDCP SN is configured by upper layers which can be of size 7, 12, 15, 18 bit. The size (length) of the HFN part in bits is equal to 32 minus the length of the PDCP SN. The various state variables in LTE is mentioned as below.
  a) Next_PDCP_TX_SN
    The variable Next_PDCP_TX_SN indicates the PDCP SN of the next PDCP SDU for a given PDCP entity. At establishment of the PDCP entity, the UE shall set Next_PDCP_TX_SN to 0.
  b) TX_HFN
    The variable TX_HFN indicates the HFN value for the generation of the COUNT value used for PDCP PDUs for a given PDCP entity. At establishment of the PDCP entity, the UE shall set TX_HFN to 0.
The receiving side of each PDCP entity shall maintain the following state variables:
  c) Next_PDCP_RX_SN
    The variable Next_PDCP_RX_SN indicates the next expected PDCP SN by the receiver for a given PDCP entity. At establishment of the PDCP entity, the UE shall set Next_PDCP_RX_SN to 0.
  d) RX_HFN
    The variable RX_HFN indicates the HFN value for the generation of the COUNT value used for the received PDCP PDUs for a given PDCP entity. At establishment of the PDCP entity, the UE shall set RX_HFN to 0.
  e) Last_Submitted_PDCP_RX_SN
    For PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to Maximum PDCP SN.
  f) Reordering_PDCP_RX_COUNT
    This variable is used only when the reordering function is used. This variable holds the value of the COUNT following the COUNT value associated with the PDCP PDU which triggered t-Reordering The difference between LTE and PDCP is as shown below in Table 1.

TABLE 1

|  | LTE | NR |
|---|---|---|
| PDCP SN Size (length) for SRB | 5 bits | 12 bits |
| PDCP SN Size (length) for DRB | 7/12/15/18 bits | 12/18 bits |
| UP Integrity | Not supported | Supported |
| UL Duplication | Not supported | Supported |
| PDCP Variable | SN | COUNT |
| Maximum SDU | 8188 bytes | Up to jumbo frame (9 KB) |
| T-reordering | Only for split bearer | Always (by configuration) |

The embodiments herein disclose a method for performing a handover in a wireless communication network. The method includes performing, by a network, a Packet Data Convergence Protocol (PDCP) version change for one or more radio bearers to switch from a first PDCP entity to a second PDCP entity. Further, the method includes receiving, by a User Equipment (UE), at least one of a PDCP version change indication and security key change indication from the network. Furthermore, the method includes performing, by the UE, a PDCP version change to switch from the first PDCP entity to the second PDCP entity for a configured radio bearer in response to receiving the PDCP version change indication and refreshing the security key associated with the concerned radio bearer in response to receiving the security key change indication.

In an embodiment, performing the PDCP version change from the first PDCP entity to the second PDCP entity in response to receiving the PDCP version change indication includes deriving a second set of state variables associated with second PDCP entity from the first set of state variables.

In some embodiments, the method includes calculating values of the second set of state variables representing TX_NEXT, RX_NEXT, RX_DELIV and RX_REORD, associated with the NR PDCP entity using the first set of state variables representing NEXT_PDCP_TX_SN, TX_HFN, NEXT_PDCP_RX_SN, RX_HFN, Last_Submitted_PDCP_RX_SN and Reordering_PDCP_RX_COUNT associated with the LTE PDCP entity. Further, the method includes updating the PDCP SN of each PDCP SDU which has undergone version change.

In various embodiments, the method includes calculating values of the second set of state variables representing NEXT_PDCP_TX_SN, TX_HFN, NEXT_PDCP_RX_SN, RX_HFN and Last_Submitted_PDCP_RX_SN associated with the LTE PDCP entity using the first set of state variables representing TX_NEXT, RX_NEXT, RX_DELIV and RX_REORD, associated with the NR PDCP entity. Further, the method includes updating the PDCP SN of each PDCP SDU which has undergone version change.

The proposed method and system supports the PDCP version change i.e., LTE PDCP or E-UTRA PDCP to NR PDCP and from NR PDCP to LTE PDCP or E-UTRA PDCP during the inter-RAT handover (e.g. from legacy LTE node connected to EPC to EN-DC capable LTE eNB connected to EPC) and bearer reconfiguration (e.g. bearer reconfiguration of MCG bearer configured with LTE PDCP to MCG bearer configured with NR-PDCP).

The proposed method and system supports the PDCP version change i.e., LTE PDCP or E-UTRA PDCP to NR PDCP and from NR PDCP to LTE PDCP or E-UTRA PDCP during the intra-RAT handover (e.g. handover within the EN-DC capable LTE eNB(s) connected to EPC) and bearer reconfiguration (e.g. bearer reconfiguration of MCG bearer configured with LTE PDCP to MCG bearer configured with NR-PDCP).

The proposed method and system supports the lossless PDCP version change i.e., LTE PDCP or E-UTRA PDCP to NR PDCP and from NR PDCP to LTE PDCP or E-UTRA PDCP during the inter-RAT handover and intra-RAT handover.

Referring now to the drawings, and more particularly to FIGS. 4 through 9, where similar reference characters denote corresponding features consistently throughout the figures, there are shown preferred embodiments.

Figure 4A:
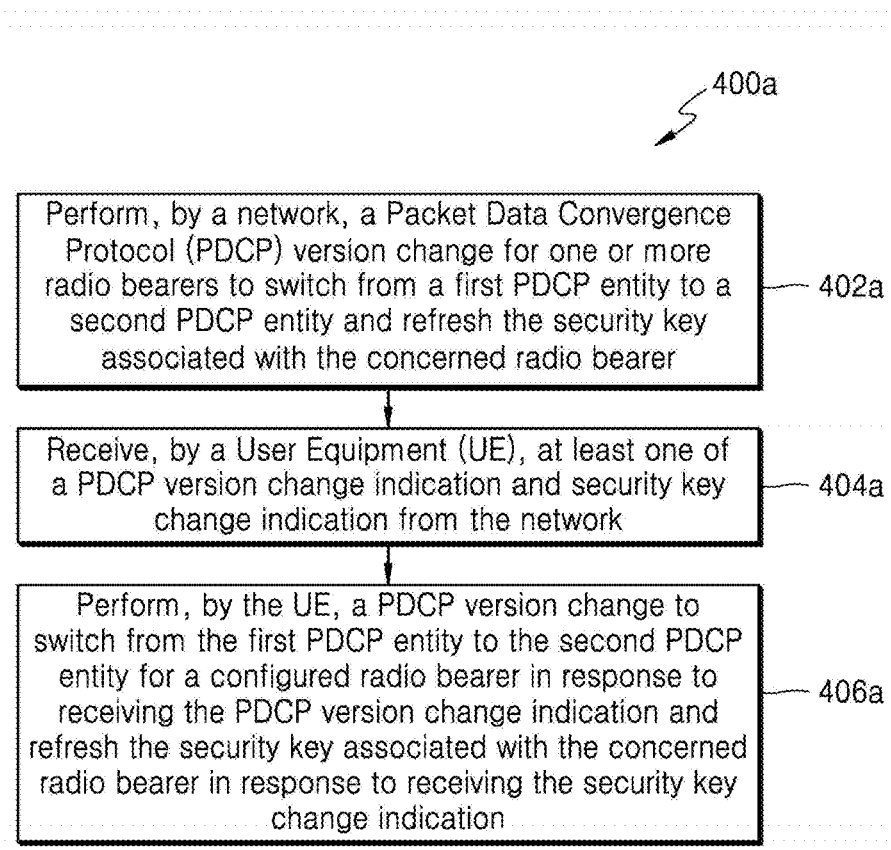
FIG. 4A is a flow chart illustrating a method for performing a handover in a wireless communication network, according to an embodiment as disclosed herein.

FIG. 4A is a flow chart 400a illustrating a method for performing a handover in a wireless communication network, according to an embodiment as disclosed herein. With the proposed method, the UE 102 and the network 104 performs the PDCP version change during the handover in the wireless communication system.

The UE 102 can be a EN-DC capable UE and a source base station i.e., serving the UE 102 can be a LTE evolved Node base station (eNB) or an E-UTRA-NR Dual Connectivity (EN-DC) capable LTE eNB. Further, the target base station to which the UE 102 performs the handover can be an LTE eNB or an EN-DC capable LTE eNB.

At step 402*a*, the method includes performing a PDCP version change for one or more radio bearers to switch from the first PDCP entity to the second PDCP entity. The method allows the network 104 to perform the PDCP version change for the one or more radio bearers to switch from the first PDCP entity to the second PDCP entity and refresh the security key associated with the concerned radio bearer. The version of first PDCP entity of the radio bearer and the version of second PDCP entity of the radio bearer can be a LTE PDCP or a NR PDCP. It should be noted that the version of first PDCP entity and second PDCP entity is not the same. The network performs the PDCP version change for the radio bearer(s) for switching from the LTE PDCP to a NR PDCP or from the NR PDCP to LTE PDCP.

In an embodiment, during the PDCP version change, the network 104 releases the configured radio bearer with the first PDCP entity and adds the radio bearer with second PDCP entity and refresh the security key associated with the concerned radio bearer.

In various embodiments, the network 104 performs the PDCP version change in a lossless manner. The PDCP version change can be performed in the lossless manner when the network 104 determines that the sequence number (SN) length of the first PDCP entity associated with the concerned radio bearer configured by a source node is less than or equal to a SN length of a second PDCP entity configured by a target node.

Further, a source node 104*a* which is serving the UE 102 transfers the first set of state variables associated with the first PDCP entity to the target node 104*b*. Further, the target node 104*b* performs PDCP re-establishment procedure and refreshes the security key associated with the concerned radio bearer for achieving the PDCP version change in a lossless manner during the handover. The network 104 can be configured to perform the PDCP version change from the LTE PDCP to the NR PDCP and from the NR PDCP to the LTE PDCP.

The various steps performed by the network 104 for achieving the PDCP version change in a lossless manner are described in the later parts of the description.

At step 404*a*, the method includes receiving at least one of a PDCP version change indication and a security key change indication from the network. The method allows the UE 102 to receive the PDCP version change indication and a security key change indication from the network.

In an embodiment, the UE 102 receives the PDCP version change indication and security key change indication in a handover command such as the Radio Resource Control (RRC) Reconfiguration message.

In some embodiments, the received PDCP version change indication and security key change indication can be explicit indication(s) or an implicit indication which includes a PDCP configuration associated with the second PDCP entity.

In an embodiment, the received PDCP version change indication (i.e., from the network) commands the UE 102 to switch from a LTE PDCP version to a NR PDCP version or from a NR PDCP version to a LTE PDCP version for the configured radio bearer. The configured radio bearer can be a Signaling Radio Bearer (SRB) except SRB0 and a Data Radio Bearer (DRB).

At step 406*a*, the method includes performing the PDCP version change to switch from the first PDCP entity to the second PDCP entity for a configured radio bearer in response to receiving the PDCP version change indication. The method further includes refreshing the security key associated with the concerned radio bearer in response to receiving the security key change indication. The method allows the UE 102 to perform the PDCP version change to switch from the first PDCP entity to the second PDCP entity for a configured radio bearer in response to receiving the PDCP version change indication. The method allows the UE 102 to refresh the security key associated with the concerned radio bearer in response to receiving the security key change indication.

The UE 102 performs the PDCP version change (i.e., to switch from the first PDCP entity to the second PDCP entity) for a configured radio bearer by releasing the configured radio bearer with first PDCP entity. Further, the UE 102 adds the radio bearer with second PDCP entity and refreshes the security key associated with the concerned radio bearer.

In various embodiments, the UE 102 performs the PDCP version change in lossless manner by performing the PDCP re-establishment for the configured radio bearer and refreshing the security key associated with the concerned radio bearer.

The various steps performed by the UE 102 for achieving the PDCP version change in a lossless manner are described in the later parts of the description.

The various actions, acts, blocks, steps, or the like in the flow chart 400*a* may be performed in the order presented, in a different order or simultaneously. Further, in some embodiments, some of the actions, acts, blocks, steps, or the like may be omitted, added, modified, skipped, or the like without departing from the scope of the invention.

Figure 4B:
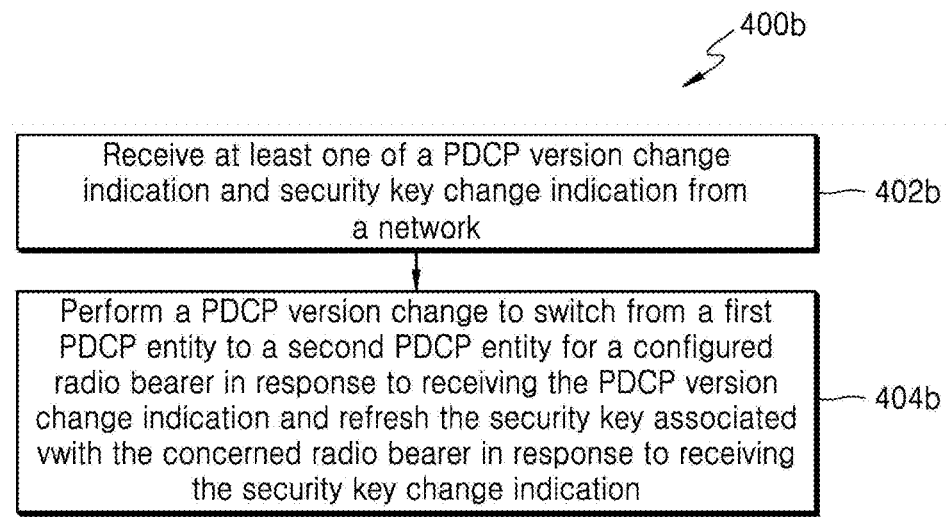
FIG. 4B is a flow chart illustrating various steps performed by a User Equipment for the handover in the wireless communication network, according to an embodiment as disclosed herein.

FIG. 4B is a flow chart illustrating various steps performed by a User Equipment for a handover in the wireless communication network, according to an embodiment as disclosed herein.

At step 402*b*, the method includes receiving at least one of a PDCP version change indication and security key change indication from the network 104. The UE 102 can be configured to receive the PDCP version change indication and security key change indication from the source node 104*a* during the handover from the source node 104*a* to a target node 104*b*. The version change indication commands the UE to switch from a LTE PDCP version to a NR PDCP version and from a NR PDCP version to a LTE PDCP version for the concerned radio bearer. The security key change indication commands the UE to refresh the security key associated with the concerned radio bearer.

At step 404*b*, the method includes performing the PDCP version change to switch from the first PDCP entity to the second PDCP entity for a configured radio bearer in response to receiving the PDCP version change indication and refreshing the security key associated with the concerned radio bearer in response to receiving the security key change indication. It should be noted that the version of first PDCP entity and the version of second PDCP entity can be a LTE PDCP or a NR PDCP. The UE 102 can be configured to perform the version change from the LTE PDCP to NR PDCP or from the NR PDCP to LTE PDCP during the handover.

Figure 4C:
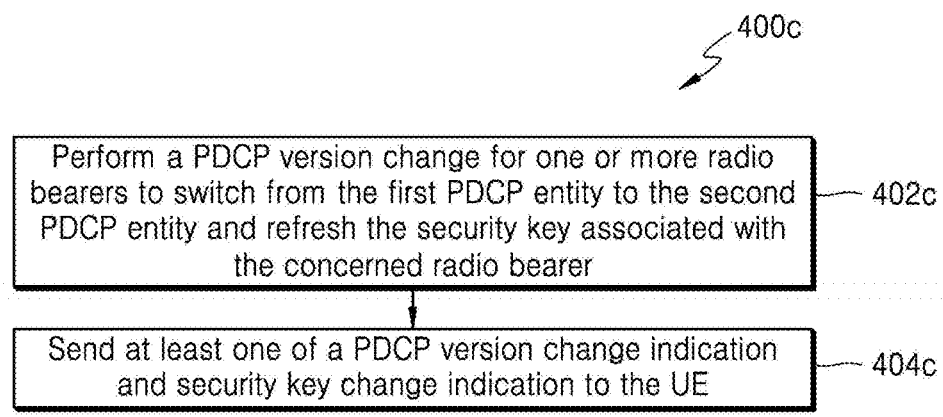
FIG. 4C is a flow chart illustrating various steps performed by a network for the handover in the wireless communication network, according to an embodiment as disclosed herein.

FIG. 4C is a flow chart 400*c* illustrating various steps performed by a network for the handover in the wireless communication network, according to an embodiment as disclosed herein.

At step 402*c*, the method includes perform a PDCP version change for one or more radio bearers to switch from the first PDCP entity to the second PDCP entity and refresh the security key associated with the concerned radio bearer.

The method allows the network (i.e., a target node 104b) to perform the PDCP version change to switch the from the first PDCP entity to the second PDCP entity. For example, the first PDCP entity can be a LTE PDCP and the second PDCP entity can be a NR PDCP. The method allows the network (i.e., a target node 104b) to refresh the security key associated with the concerned radio bearer. Thus, the target node 104b can be configured to perform the PDCP version change to switch the from the first PDCP entity to the second PDCP entity and refresh the security key associated with concerned radio bearer.

At step 404c, the method includes sending a PDCP version change indication to the UE 102. The method allows the network (i.e., the source node 104a) to send at least one of a PDCP version change indication and security key change indication to the UE 102. The PDCP version change indication is received by the source node 104a from the target node 104b after the target node 104b decides to perform PDCP version change. The source node 104a sends at least one of a PDCP version change indication and security key change indication to the UE 102 in a handover command such as the RRC reconfiguration message.

Figure 4D:
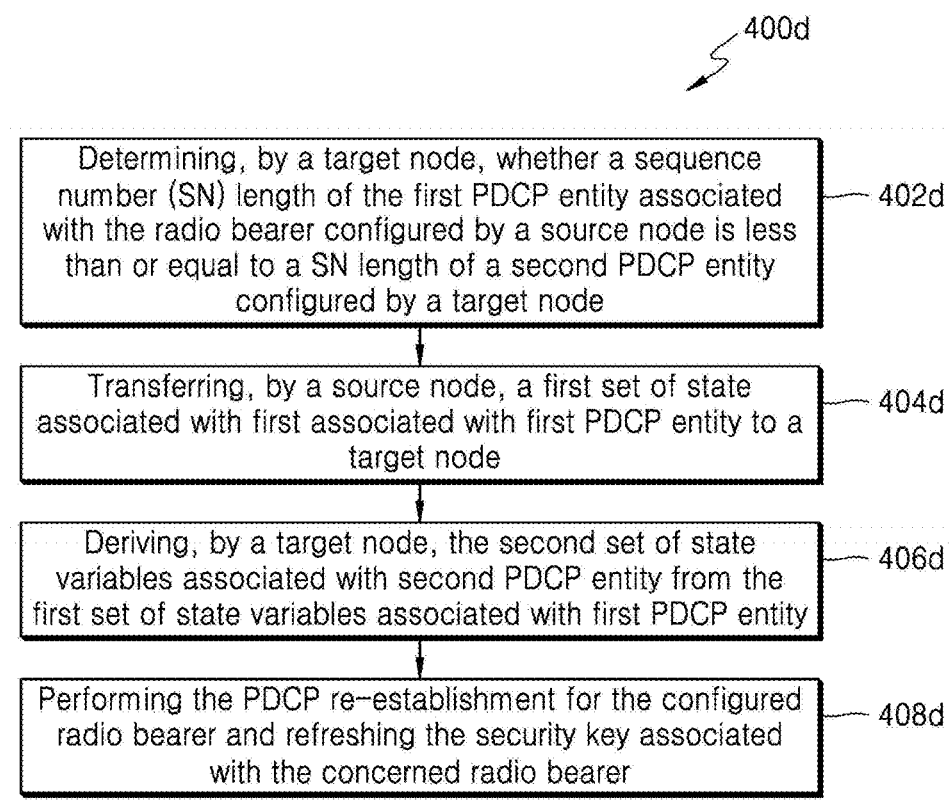
FIG. 4D is a flow chart illustrating various steps performed by the network for a PDCP version change from the first PDCP entity to the second PDCP entity for one or more configured radio bearers in a lossless manner, according to an embodiment as disclosed herein.

FIG. 4D is a flow chart 400d illustrating various steps performed by the network for a PDCP version change in a lossless manner from the first PDCP entity to the second PDCP entity for one or more configured radio bearers, according to an embodiment as disclosed herein.

In order to perform the PDCP version change from the first PDCP entity to the second PDCP entity for the one or more configured radio bearers in a lossless manner, at step 402d, the method includes determining, by the target node 104b, whether a sequence number (SN) length (i.e. size) of the first PDCP entity associated with the radio bearer configured by the source node 104a is less than or equal to a SN length of a second PDCP entity configured by the target node 104b. It should be noted, for the lossless handover, the SN length (size) of the first PDCP entity at the source node is less than or equal to the SN length (size) of a second PDCP entity configured by the target node 104b. The above mentioned criterion is determined for performing the lossless PDCP version change.

At step 404d, the method includes transferring, by a source node 104a, a first set of state variables associated with first PDCP entity to a target node 104b. The source node 104a which can be a legacy LTE node or an EN-DC capable LTE node can be configured to transfer the first set of state variables associated with first PDCP entity to a target node 104b. For example, if the source node 104a is a legacy LTE node, the first set of state variables includes the state variables representing the LTE PDCP.

At step 406d, the method allows the target node 104b to perform the PDCP version change from the LTE PDCP to the NR PDCP by deriving the second set of state variables (i.e., NR PDCP state variables representing TX_NEXT, RX_NEXT, RX_DELIV and RX_REORD of NR PDCP entity) from the first set of state variables (i.e., LTE PDCP state variables representing NEXT_PDCP_TX_SN, TX_HFN, NEXT_PDCP_RX_SN, RX_HFN, Last_Submitted_PDCP_RX_SN and Reordering_PDCP_RX_COUNT of the LTE PDCP entity).

For example, if the source node 104a is a EN-DC capable LTE node, the first set of state variables includes the state variables representing the NR PDCP. Further the method allows the target node 104b to perform the PDCP version change from the NR PDCP to the LTE PDCP by deriving the second set of state variables (i.e., LTE PDCP state variables representing NEXT_PDCP_TX_SN, TX_HFN, NEXT_PDCP_RX_SN, RX_HFN, Last_Submitted_PDCP_RX_SN and Reordering_PDCP_RX_COUNT of LTE PDCP entity) from the first set of state variables (i.e., NR PDCP state variables representing TX_NEXT, RX_NEXT, RX_DELIV and RX_REORD of the NR PDCP entity).

The various steps involved in deriving the second set of state variables from the first set of the state variables for the PDCP version change from the LTE PDCP to the NR PDCP and from NR PDCP to the LTE PDCP are described in the FIGS. 4E-4H.

At step 408d, the method includes performing the PDCP re-establishment based on the second set of state variables associated with the second PDCP entity corresponding to the configured radio bearer. The method further includes refreshing the security key associated with the concerned radio bearer. The target node 104b performs the PDCP re-establishment for the configured bearer to perform the PDCP version change from the first PDCP entity to the second PDCP entity and refresh the security key associated with the concerned radio bearer. The PDCP version change takes place at the UE 102 and at the target node 104d for switching from the first PDCP entity to the second PDCP entity.

Figure 4E:
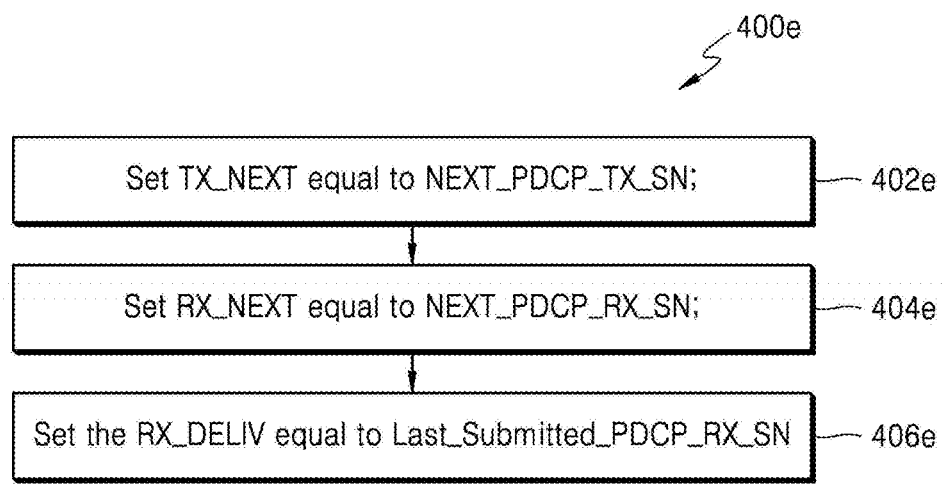
FIG. 4E is a flow chart illustrating various steps involved in performing the PDCP version change from a LTE PDCP entity to a NR PDCP entity during the handover, according to an embodiment as disclosed herein.

FIG. 4E is a flow chart 400e illustrating various steps involved in performing a PDCP version change from a LTE PDCP entity to a NR PDCP entity during the handover, according to an embodiment as disclosed herein.

The various steps involved in performing the PDCP version change from the LTE PDCP entity of the concerned radio bearer configured by the source base station to the NR PDCP entity configured by the target base station during the handover are described in the flow chart 400e.

For performing the PDCP version change from the LTE PDCP entity to the NR PDCP entity, the method includes deriving the second set of state variables of the NR PDCP entity (i.e., TX_NEXT, RX_NEXT, RX_DELIV and RX_REORD of the NR PDCP entity) from the first set of state variables of the LTE PDCP entity (i.e., NEXT_PDCP_TX_SN, TX_HFN, NEXT_PDCP_RX_SN, RX_HFN, Last_Submitted_PDCP_RX_SN and Reordering_PDCP_RX_COUNT of LTE PDCP entity). The second set of state variables representing the NR PDCP entity are initialized to some values as described below. The below steps can be configured to the UE 102 and the target node 104b to perform the PDCP version change from LTE PDCP to NR PDCP.

At step 402e, the method includes setting TX_NEXT equal to NEXT_PDCP_TX_SN. In an embodiment, the TX_NEXT is calculated based on NEXT_PDCP_TX_SN and HFN=0. TX_NEXT=($2^{Y}$*HFN)+NEXT_PDCP_TX_SN where Y is equal to size or length (in bits) of PDCP SN in NR PDCP. In other words, TX_NEXT is set to Next_PDCP_TX_SN.

At step 404e, the method includes setting the RX_NEXT equal to NEXT_PDCP_RX_SN. In an embodiment, the RX_NEXT is calculated based on NEXT_PDCP_RX_SN and HFN=0. RX_NEXT=($2^{Y}$*HFN)+Next_PDCP_RX_SN where Y is equal to size or length (in bits) of PDCP SN in NR PDCP. In other words, RX_NEXT is set to Next_PDCP_RX_SN.

At step 406e, the method includes setting the RX_DELIV equal to Last_Submitted_PDCP_RX_SN. In an embodiment, the RX_DELIV can be calculated as based on Last_Submitted_PDCP_RX_SN and HFN=0. RX_DELIV=($2^{Y}$*HFN)+Last_Submitted_PDCP_RX_SN where Y is equal to size or length (in bits) of PDCP SN in NR PDCP. In other words RX_DELIV is set to Last_Submitted_PDCP_RX_SN.

RX_REORD can be calculated based on first packet received from lower layers i.e., based on RX_NEXT.

The PDCP status report is prepared based on Last_Submitted_PDCP_RX_SN

The proposed method can also be used when the PDCP SN size in the NR PDCP is equal to the PDCP SN size in the LTE PDCP.

The various actions, acts, blocks, steps, or the like in the flow chart 400e may be performed in the order presented, in a different order or simultaneously. Further, in some embodiments, some of the actions, acts, blocks, steps, or the like may be omitted, added, modified, skipped, or the like without departing from the scope of the invention.

Figure 4F:
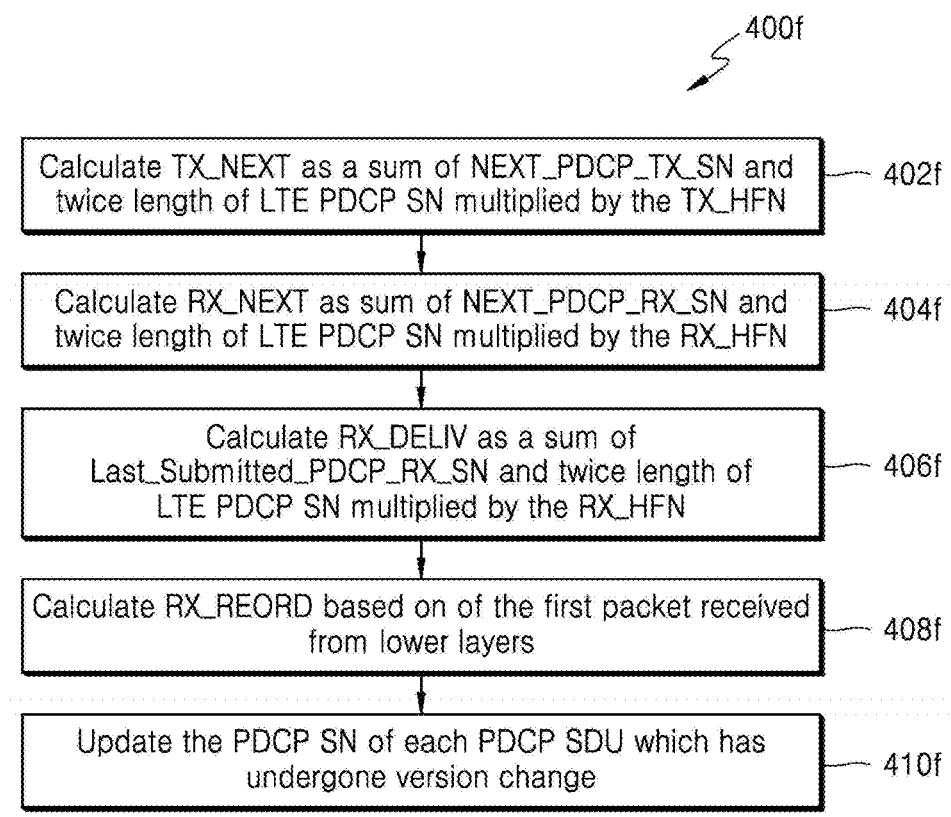
FIG. 4F is a flow chart illustrating various steps involved in performing the PDCP version change from the LTE PDCP entity to the NR PDCP entity during the handover, according to an embodiment as disclosed herein.

FIG. 4F is another flow chart 400f illustrating various steps involved in an alternate way of performing a PDCP version change from a LTE PDCP entity to a NR PDCP entity during the handover, according to an embodiment as disclosed herein.

At step 402f, the method includes calculating the TX_NEXT as a sum of NEXT_PDCP_TX_SN and twice length of LTE PDCP SN multiplied by the TX_HFN.

In an embodiment, the TX_NEXT is calculated as TX_NEXT=(2X*TX_HFN)+NEXT_PDCP_TX_SN, where X is equal to size or length (in bits) of PDCP SN in LTE PDCP.

At step 404f, the method includes calculating the RX_NEXT as sum of NEXT_PDCP_RX_SN and twice length of LTE PDCP SN multiplied by the RX_HFN.

In an embodiment, the RX_NEXT is calculated as RX_NEXT=(2X*RX_HFN)+NEXT_PDCP_RX_SN, where X is equal to size or length (in bits) of PDCP SN in LTE PDCP.

At step 406f, the method includes calculating RX_DELIV as a sum of Last_Submitted_PDCP_RX_SN and twice length of LTE PDCP SN multiplied by the RX_HFN.

In an embodiment, value of RX_DELIV can be calculated based on Last_Submitted_PDCP_RX_SN and RX_HFN in LTE PDCP. i.e., RX_DELIV=(2X*RX_HFN)+Last_Submitted_PDCP_RX_SN, where X is equal to size or length (in bits) of PDCP SN in LTE PDCP.

At step 408f, the method includes calculating RX_REORD based on of the first packet received from lower layers (i.e., based on the value of RX_NEXT)

In an embodiment, RX_REORD can be calculated based on the first packet received from lower layers (i.e., based on the value of RX_NEXT).

At step 410f, the method includes updating the PDCP SN of each PDCP SDU which has undergone version change. The PDCP SN of each PDCP SDU which is already associated with PDCP SN at the time of PDCP entity re-establishment is updated.

In an embodiment, the method includes calculating the PDCP SN of each PDCP SDU by considering the least significant bits of the Count Value associated with the PDCP SDU at the LTE PDCP entity, wherein the length of least significant bits of COUNT value is equal to the length of PDCP SN at the second PDCP entity.

In an embodiment, the new PDCP SN of PDCP SDU=Y LSBs of [COUNT value of this PDCP SDU in LTE PDCP]=Y LSBs of [(2X*HFN of this PDCP SDU in LTE PDCP)+PDCP SN of this PDCP SDU in LTE PDCP]. X is equal to size or length (in bits) of PDCP SN in LTE PDCP. Y is equal to size or length (in bits) of PDCP SN in NR PDCP The proposed method can also be used when the PDCP SN size in NR PDCP is equal to PDCP SN size in LTE PDCP.

The various actions, acts, blocks, steps, or the like in the flow chart 400f may be performed in the order presented, in a different order or simultaneously. Further, in some embodiments, some of the actions, acts, blocks, steps, or the like may be omitted, added, modified, skipped, or the like without departing from the scope of the invention.

FIG. 4G is a flow chart 400g illustrating various steps involved in performing a PDCP version change from a NR PDCP entity to a LTE PDCP entity during the handover, according to an embodiment as disclosed herein.

The proposed method provides a mechanism for PDCP version change from the NR PDCP to LTE PDCP version when PDCP SN size in LTE is greater than PDCP SN size in NR PDCP. The various steps involved in performing the PDCP version change from the NR PDCP entity in the source base station to the LTE PDCP entity in the target base station during the handover are described in the flow chart 400d.

At step 402g, the method includes setting TX_HFN to zero. At step 404g, the method includes setting RX_HFN to zero. The UE 102 initializes the HFN value to zero during the PDCP re-establishment procedure.

At step 406g, the method includes setting NEXT_PDCP_TX_SN equal to value of 'N' least significant bits of TX_NEXT. The Next_PDCP_TX_SN from TX_NEXT (based on source SN length). Next_PDCP_TX_SN=value of Y LSBs of TX_NEXT where Y is equal to size (in bits) of PDCP SN in NR PDCP. The 'N' denotes the length of PDCP SN of first PDCP entity.

At step 408g, the method includes setting NEXT_PDCP_RX_SN equal to value of 'N' least significant bits of RX_NEXT. The Next_PDCP_RX_SN is calculated from RX_NEXT (based on source SN length). The Next_PDCP_RX_SN=value of Y LSBs of RX_NEXT where Y is equal to size (in bits) of PDCP SN in NR PDCP. The 'N' denotes the length of PDCP SN of first PDCP entity.

At step 410g, the method includes setting Last_Submitted_PDCP_RX_SN equal to value of 'N' least significant bits of RX_DELIV. The Last_Submitted_PDCP_RX_SN is calculated from RX_DELIV (based on source SN length). Last_Submitted_PDCP_RX_SN=value of Y LSBs of RX_DELIV where Y is equal to size (in bits) of PDCP SN in NR PDCP. The 'N' denotes the length of PDCP SN of first PDCP entity.

The various actions, acts, blocks, steps, or the like in the flow chart 400g may be performed in the order presented, in a different order or simultaneously. Further, in some embodiments, some of the actions, acts, blocks, steps, or the like may be omitted, added, modified, skipped, or the like without departing from the scope of the invention.

Figure 4H:
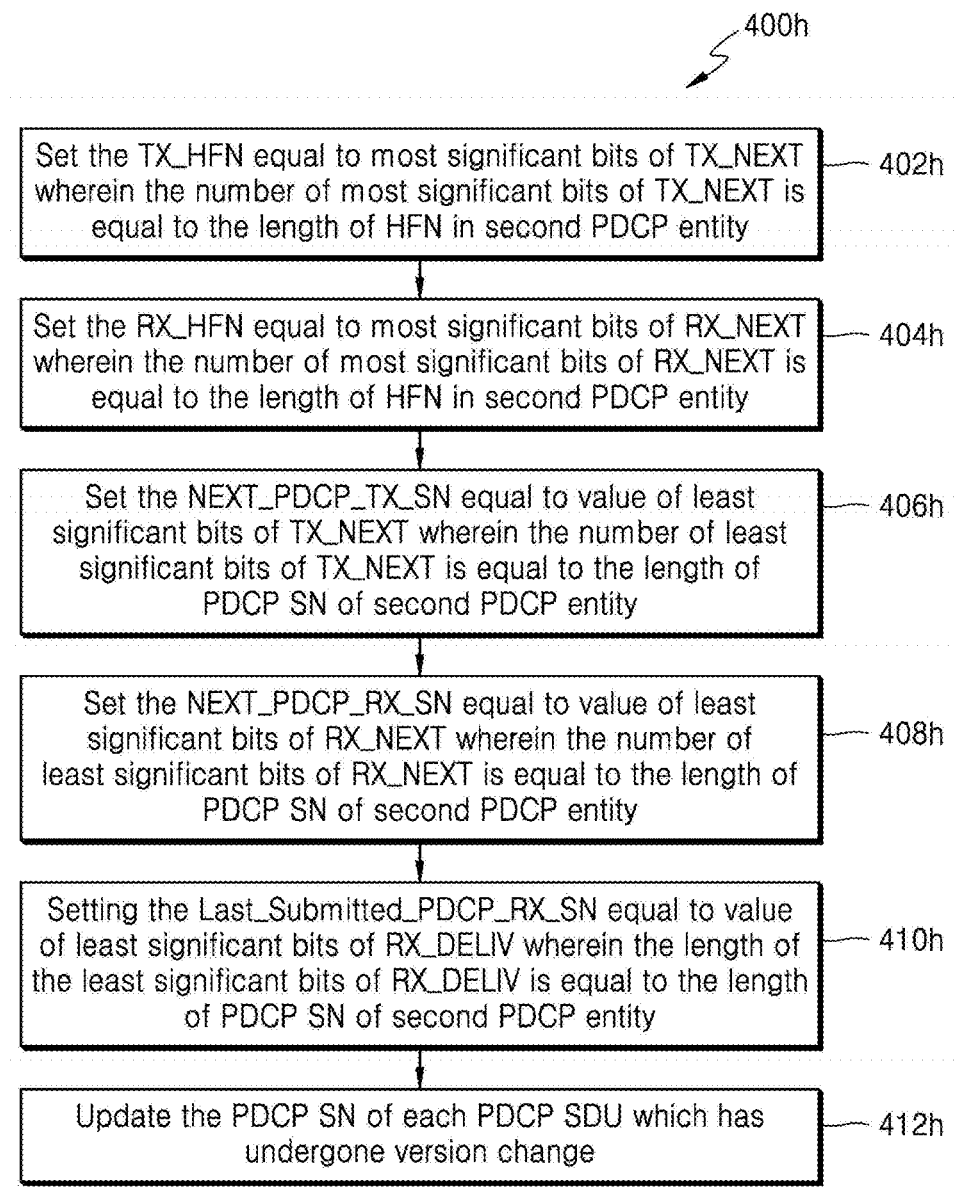
FIG. 4H is another flow chart illustrating various steps involved in performing a PDCP version change from the NR PDCP entity to the LTE PDCP entity during the handover, according to an embodiment as disclosed herein.

FIG. 4H is another flow chart 400h illustrating various steps involved in performing a PDCP version change from a NR PDCP entity to a LTE PDCP entity during the handover, according to an embodiment as disclosed herein. The various steps involved in performing the PDCP version change from the NR PDCP entity in the source base station to the LTE PDCP entity in the target base station during the handover are described in the flow chart 400e. Thus, during the PDCP version change from the NR PDCP entity to the LTE PDCP entity, the second set of state variables representing NEXT_PDCP_TX_SN, TX_HFN, NEXT_PDCP_RX_SN, RX_HFN and Last_Submitted_PDCP_RX_SN associated with the LTE PDCP entity are derived using the first set of state variables representing TX_NEXT, RX_NEXT, RX_DELIV and RX_REORD, associated with the NR PDCP entity.

At step 402h, the method includes setting the TX_HFN equal to most significant bits of TX_NEXT wherein the number of most significant bits of TX_NEXT is equal to the length of HFN in second PDCP entity. The TX_HFN is calculated from TX_NEXT (based on target SN length). TX_HFN=value of X1 MSBs of TX_NEXT where X1 is equal to size (in bits) of HFN in LTE PDCP.

At step 404h, the method includes setting the RX_HFN equal to most significant bits of RX_NEXT wherein the number of most significant bits of RX_NEXT is equal to the length of HFN in second PDCP entity. The RX_HFN is calculated from RX_NEXT based on target SN length). RX_HFN=value of X1 MSBs of RX_NEXT where X1 is equal to size (in bits) of HFN in LTE PDCP.

At step 406h, the method includes setting the NEXT_PDCP_TX_SN equal to value of least significant bits of TX_NEXT wherein the number of least significant bits of TX_NEXT is equal to the length of PDCP SN of second PDCP entity. The Next_PDCP_TX_SN is calculated from TX_NEXT based on target SN length). Next_PDCP_TX_SN=value of X LSBs of TX_NEXT where X is equal to size (in bits) of PDCP SN in LTE PDCP.

At step 408h, the method includes setting the NEXT_PDCP_RX_SN equal to value of least significant bits of RX_NEXT wherein the number of least significant bits of RX_NEXT is equal to the length of PDCP SN of second PDCP entity. The Next_PDCP_RX_SN is calculated from RX_NEXT (based on target SN length). Next_PDCP_RX_SN=value of X LSBs of RX_NEXT where X is equal to size (in bits) of PDCP SN in LTE PDCP.

At step 410h, the method includes setting the Last_Submitted_PDCP_RX_SN equal to value of least significant bits of RX_DELIV wherein the length of the least significant bits of RX_DELIV is equal to the length of PDCP SN of second PDCP entity. The Last_Submitted_PDCP_RX_SN is calculated from RX_DELIV (based on target SN length). Last_Submitted_PDCP_RX_SN=value of X LSBs of RX_DELIV where X is equal to size (in bits) of PDCP SN in LTE PDCP.

At step 412h, the method includes updating the PDCP SN of each PDCP SDU which has undergone version change.

As NR is supporting reordering, to support in sequence delivery in LTE the PDCP status report will be prepared based on RX_DELIV.

The PDCP SN of each PDCP SDU which is associated with PDCP SN at the time of PDCP entity re-establishment is updated as follows:

New PDCP SN of PDCP SDU=X LSBs of [COUNT value of this PDCP SDU in NR PDCP]=X LSBs of [($2^{Y}$*HFN of this PDCP SDU in NR PDCP)+PDCP SN of this PDCP SDU Cin NR PDCP]. X is equal to size (in bits) of PDCP SN in LTE PDCP. Y is equal to size (in bits) of PDCP SN in NR PDCP.

In an embodiment, this method can also be used when PDCP SN size in NR PDCP is equal to PDCP SN size in LTE PDCP.

The various actions, acts, blocks, steps, or the like in the flow chart 400h may be performed in the order presented, in a different order or simultaneously. Further, in some embodiments, some of the actions, acts, blocks, steps, or the like may be omitted, added, modified, skipped, or the like without departing from the scope of the invention.

Figure 5:
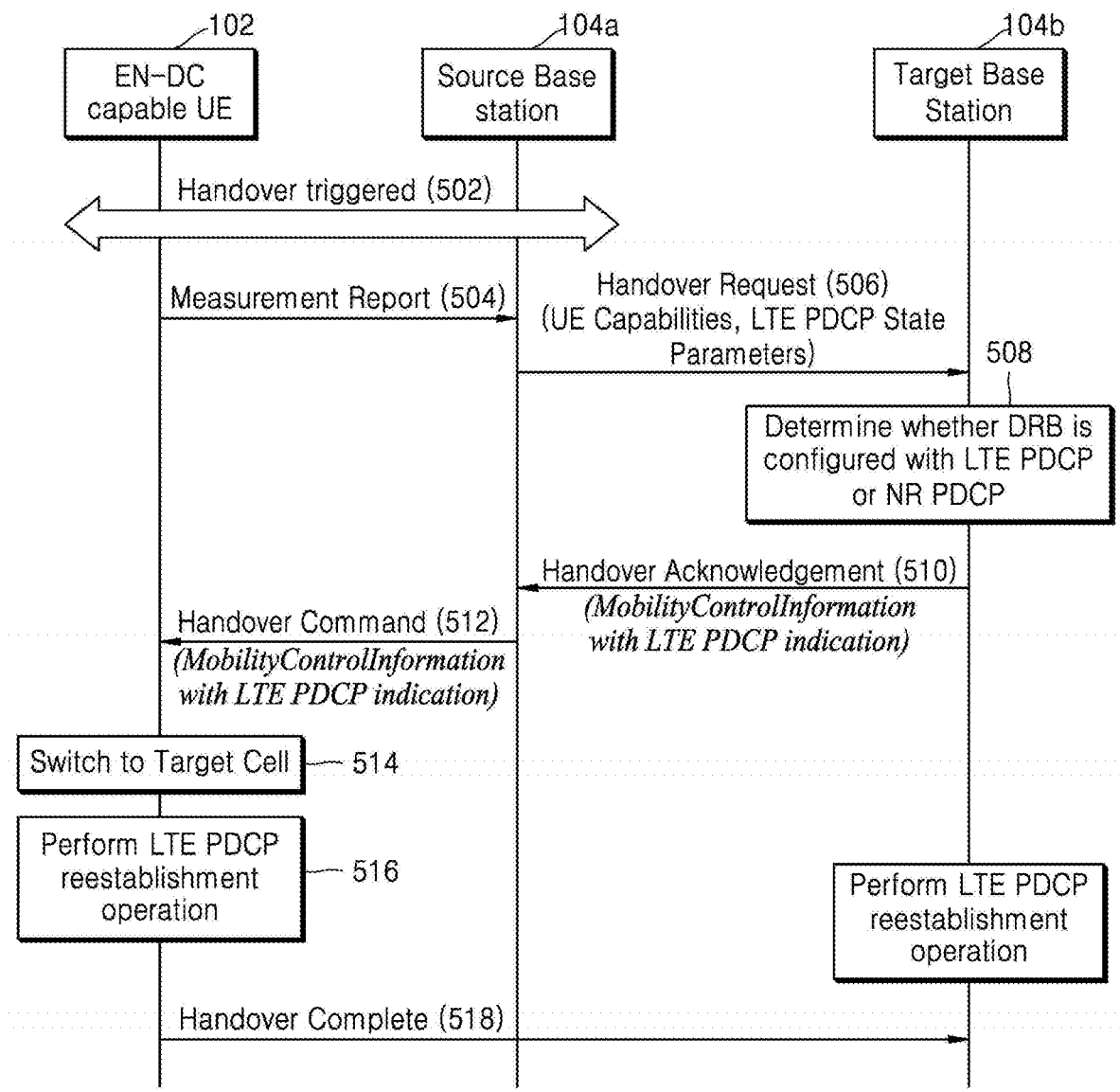
FIG. 5 is a sequence diagram illustrating various steps which the UE performs during a handover from a source base station to a target base station, according to an embodiment as disclosed herein.

FIG. 5 is a sequence diagram illustrating various steps which the UE performs a handover from a source base station to a target base station, according to an embodiment as disclosed herein. The FIG. 5 depicts the handover of the UE 102 connected to a source base station 104a (i.e., legacy LTE node) towards a target base station 104b (which is Rel-15 LTE node which is EN-DC capable base station). Since the source node 104a is legacy LTE node the radio bearer configured by LTE eNB has LTE PDCP entity. Since the target node 104b is EN-DC capable LTE eNB the radio bearer configured by EN-DC LTE eNB can have either LTE PDCP or NR PDCP. The handover is triggered (502) during the mobility of the UE 102 from source towards target depending on the signal strength. The UE 102 sends (504) a measurement report to the source base station 104a when the handover event is triggered. On the X2 interface, the source base station 104a i.e., LTE eNB sends (506) the handover request message to the target base station 104b i.e., EN-DC capable LTE eNB. The HO request message includes HandoverPreparationInformation comprising the as-Config, rrm-Config, ue-RadioAccessCapabilityInfo, as-Context etc. The ue-RadioAccessCapabilityInfo indicates the UE capabilities i.e. the UE is EN-DC capable and the as-Config includes the LTE PDCP state parameters like NEXT_PDCP_TX_SN, TX_HFN, NEXT_PDCP_RX_SN, RX_HFN, Last_Submitted_PDCP_RX_SN and Reordering_PDCP_RX_COUNT. Based on the information provided in the HandoverPreparationInformation the target base station 104b decides (508) whether the DRBs of the UE undergoing handover should be configured with LTE PDCP or NR PDCP. If the DRBs of the UE need to be configured with NR PDCP then this involves PDCP version change comprising the translation of LTE PDCP state parameters sent by the source into NR PDCP parameters. The UE also needs to be informed whether it continues with LTE PDCP in the target or whether it needs to perform PDCP version change. This is indicated (510) to the UE 102 by the target base station 104b through the RRC container included in the Handover Acknowledgement message sent to the source base station 104a on the X2 interface. The source base station 104a forwards (512) the RRC container received from the target base station 104b which includes the mobility control information to the UE 102. The mobility control information includes at least one of the PDCP version change indication and security key change indication. In FIG. 5, it is shown the UE 102 does not receive the PDCP version change indication and the UE 102 switches (514) to the target base station 104b, performs (516) PDCP reestablishment operation i.e., the UE 102 shall establish the DRBs in the target based on LTE PDCP. One reason for not changing the PDCP version when the UE 102 is handed over to the target 104b could the criterion for lossless version change is not satisfied. Further, the UE 102 sends (518) a handover complete command to the target base station 104b.

Figure 6:
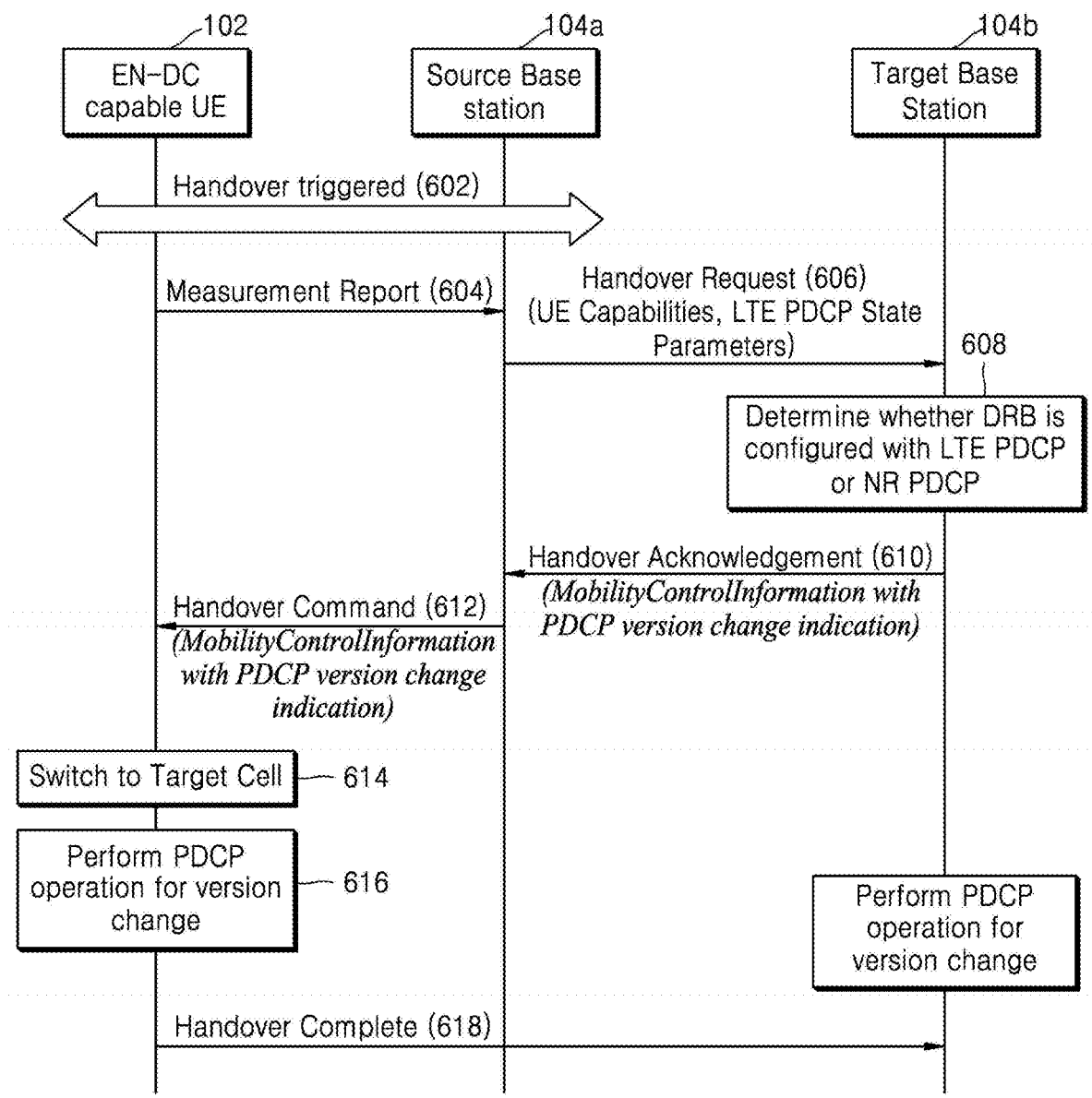
FIG. 6 is a sequence diagram illustrating various steps during handover in which the UE performs a PDCP version change from LTE PDCP entity to a NR PDCP entity, according to an embodiment as disclosed herein.

FIG. 6 is a sequence diagram illustrating various steps during handover in which the UE performs a PDCP version change from LTE PDCP entity to a NR PDCP entity, according to an embodiment as disclosed herein. In the FIG. 6, it is shown that the UE 102 receives (612) the PDCP version change indication i.e., the UE 102 shall establish the DRBs in the target based on NR PDCP. After receiving the HO command message i.e. RRC reconfiguration message including mobility control information, the UE 102 either performs normal LTE PDCP re-establishment or the UE performs (616) PDCP version change operation while re-establishing the PDCP. The UE 102 receives the mobility control information including the PDCP version change indication (LTE PDCP to NR PDCP) and security key change indication, the UE performs the PDCP version change operation from LTE PDCP to NR PDCP while re-establishing the PDCP for the concerned DRB in the target node 104b. For the PDCP version change from the LTE PDCP to the NR PDCP, it should be noted that the NR PDCP SN size should be either equal or greater than the LTE PDCP SN size. The target node 104b sends the PDCP version change indication because the criterion is met. The mechanism for PDCP version change using the handover procedure is also applicable for signaling radio bearer (SRB) except SRB0.

Figure 7:
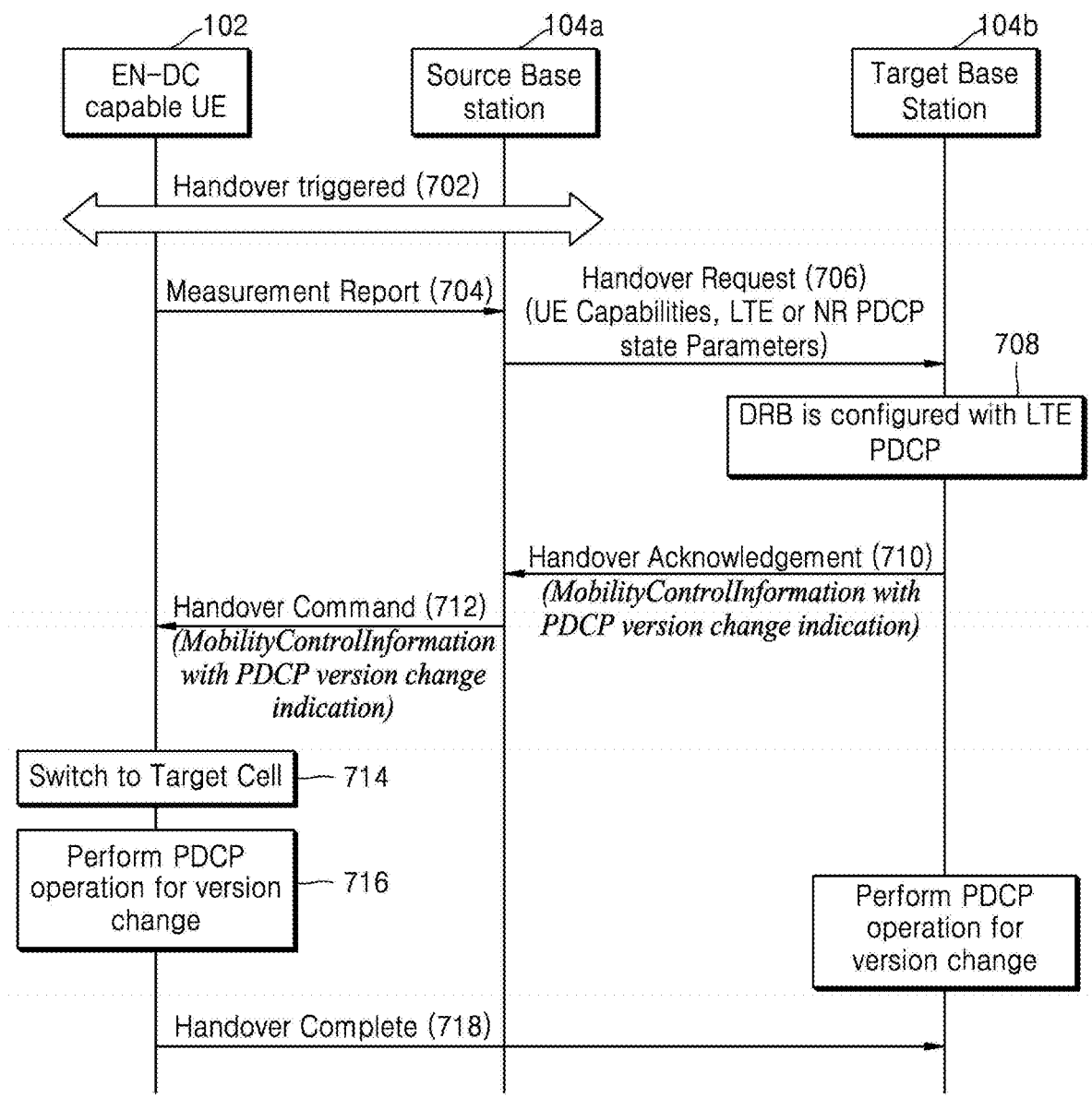
FIG. 7 is a sequence diagram illustrating various steps involved during handover in which the UE performs a PDCP version change from a NR PDCP entity to a LTE PDCP entity, according to an embodiment as disclosed herein.

FIG. 7 is a sequence diagram illustrating various steps involved during handover of the UE connected to Rel-15 LTE node which is EN-DC capable towards legacy LTE node, according to an embodiment as disclosed herein. The FIG. 7 depicts the handover of the UE 102 connected to source base station 104a i.e., Rel-15 LTE node which is EN-DC capable towards the target base station 104b i.e., a legacy LTE node. On the X2 interface the source base station 104a i.e. EN-DC capable LTE eNB sends (706) the handover request message to the target i.e. LTE eNB. The HO request message includes HandoverPreparationInformation comprising the as-Config, rrm-Config, ue-RadioAccess-CapabilityInfo, as-Context etc. The ue-RadioAccessCapabilityInfo indicates the UE capabilities i.e., the UE is EN-DC capable and the as-Config includes the either LTE PDCP state parameters like NEXT_PDCP_TX_SN, TX_HFN, NEXT_PDCP_RX_SN, RX_HFN, Last_Submitted_PDCP_RX_SN and Reordering_PDCP_RX_COUNT or NR PDCP parameters like TX_NEXT, RX_NEXT, RX_DELIV and RX_REORD depending on whether the PDCP configuration of the DRB in the source base station 104a. Since the source node 104a is EN-DC capable LTE eNB the radio bearer configured by EN-DC LTE eNB can have either LTE PDCP or NR PDCP.

Based on the information provided in the HandoverPreparationInformation, the target base station 104b decides the DRBs of the UE undergoing handover should be configured with the LTE PDCP regardless of the PDCP configuration of DRBs in the source base station 104a. If the DRBs of the UE 102 was configured with NR PDCP in the source base station 104a, then this involves PDCP version change comprising the translation of NR PDCP state parameters sent by the source base station 104a into LTE PDCP parameters, otherwise the handover is like a normal LTE handover. The UE 102 also needs to be informed whether it needs to perform PDCP version change if NR PDCP was configured for the DRB in the source base station or it continues with LTE PDCP in the target base station. This is indicated (710) to the UE 102 by the target base station 104a through the RRC container included in the Handover Acknowledgement message sent to the source on the X2 interface. The source base station 104a forwards (712) the RRC container received from the target which includes the mobility control information to the UE. In the FIG. 7, it is shown that the UE 102 receives the PDCP version change indication i.e., UE shall establish the DRBs in the target based on LTE PDCP. After receiving the HO command message i.e. RRC reconfiguration message including mobility control information the UE either perform normal LTE PDCP re-establishment or the UE performs (716) PDCP version change operation (i.e. NR PDCP to LTE PDCP) while re-establishing the PDCP. The UE 102 receives the mobility control information including the PDCP version change indication (NR PDCP to LTE PDCP) and security key change indication, the UE performs the PDCP version change operation from NR PDCP to LTE PDCP while re-establishing the PDCP for the concerned DRB in the target node 104b. For the PDCP version change from NR PDCP to LTE PDCP, the LTE PDCP SN size should be either equal or greater than the NR PDCP SN size. The LTE PDCP entities (i.e. PDCP TX/RX entities) at the target base station 104a i.e., legacy LTE node and the UE 102 can be re-established to ensure lossless data transmission and reception.

In the FIG. 6 and FIG. 7, the PDCP version change can be lossless when the criterion is met i.e. the target node 104b determines whether a sequence number (SN) length of the first PDCP entity associated with the radio bearer configured by a source node 104a is less than or equal to a SN length of a second PDCP entity configured by a target node 104b. In other words the NR PDCP SN size should be either equal or greater than the LTE PDCP SN size in FIG. 6 and LTE PDCP SN size should be either equal or greater than the NR PDCP SN size in FIG. 7. The HO command message i.e. LTE RRC reconfiguration message including mobility control information sent to the UE either includes an explicit indication for PDCP version change and security key change indication or an implicit indication. The implicit indication is based on including the radio bearer configuration which includes the PDCP configuration. If the radio bearer configuration is a NR RRC container included LTE RRC reconfiguration message then the PDCP configuration included in the radio bearer configuration is associated with NR PDCP. If the NR RRC container is not included in the LTE RRC reconfiguration message then PDCP configuration included in LTE RRC reconfiguration message is associated with LTE PDCP.

If the lossless PDCP version change criterion is not met, then PDCP version change can be still realized albeit incurring data loss during handover. This is accomplished by sending the HO command message i.e. RRC reconfiguration message including mobility control information to the UE wherein the DRBs configured to the UE undergoing handover are released and the added within the same HO command message.

Handover procedure in LTE and NR triggers PDCP re-establishment procedure wherein the security key is refreshed. For AM bearers, PDCP SN or count is maintained and header compression is reset. Once PDCP re-establishment is completed for AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment.

State variables are maintained during the NR and LTE PDCP re-establishment procedure.

During LTE PDCP to/from NR PDCP version change as state variables are different between NR and LTE, mapping between LTE and NR state variables to support lossless transition during version change is needed.

Mapping method from LTE to NR PDCP version is changed when PDCP SN size is same in LTE and NR PDCP.

If the size of PDCP SN in LTE PDCP and NR PDCP is same (say N1 bits) then in case of change from LTE PDCP to NR PDCP, NR PDCP state variables can be determined using the LTE state variables in the proposed invention as shown in Table 2 below.

TABLE 2

| NR Parameters | Derivation of NR parameters from LTE parameters |
|---|---|
| TX_NEXT | Next_PDCP_TX_SN + TX_HFN ($2^{N1}$ *TX_HFN) + Next_PDCP_TX_SN where N1 is equal to size (in bits) of PDCP SN in LTE |
| RX_NEXT | Next_PDCP_RX_SN and RX_HFN ($2^{N1}$ *RX_HFN) + Next_PDCP_RX_SN where N1 is equal to size (in bits) of PDCP SN |
| RX_REORD | Need to calculate based on PDCP and RX_HFN of first received packet in DL |
| RX_DELIV | Last_Submitted_PDCP_RX_SN + RX_HFN ($2^{N1}$ *RX_HFN) + Last_Submitted_PDCP_RX_SN where N1 is equal to size (in bits) of PDCP SN |

The parameters like RX_REORD is not required when NR to LTE PDCP version change takes place as LTE is not supporting reordering operation for MCG DRB or standalone LTE DRB but the same is required during LTE to NR as NR always supports reordering and this need to be calculated based on first received packet in DL.

Mapping method from NR PDCP to LTE PDCP version is changed when PDCP SN size is same in LTE and NR PDCP.

If the size of PDCP SN in LTE PDCP and NR PDCP is same (say N1 bits) then in case of change from NR PDCP to LTE PDCP, LTE PDCP state variables can be determined using the NR state variables in the proposed invention as shown in Table 3 below.

TABLE 3

| LTE Parameters | Derivation of LTE parameters from NR parameters |
|---|---|
| Next_PDCP_TX_SN | value of N1 LSBs of TX_NEXT where N1 is equal to size (in bits) of PDCP SN |
| TX_HFN | value of N2-N1 LSBs of TX_NEXT where N2 is equal to size (in bits) of COUNT |
| Next_PDCP_RX_SN | value of N1 LSBs of RX_NEXT where N1 is equal to size (in bits) of PDCP SN |
| RX_HFN | value of N2-N1 LSBs of RX_NEXT where N2 is equal to size (in bits) of COUNT |
| Last_Submitted_PDCP_RX_SN | value of N1 LSBs of RX_DELIV where N1 is equal to size (in bits) of PDCP SN |
| Reordering_PDCP_RX_COUNT | value of RX_REORD |

Figure 8:
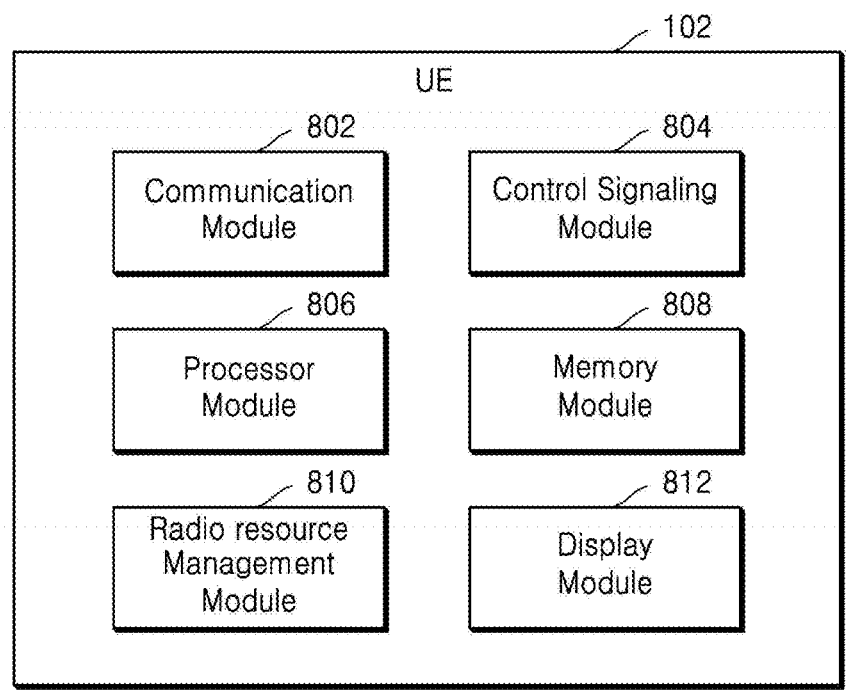
FIG. 8 illustrates various components of the UE, according to an embodiment as disclosed herein.

FIG. 8 illustrates various components of the UE 102 for performing the handover, according to an embodiment as disclosed herein. The primary components present for communication include a communication module 802, a control signaling module 804, a processor module 806, a memory module 808, a radio resource management module 810 and a display module 812.

In an embodiment, the communication module 802 is configured to decode a synchronization signal, the beam index sequence, PBCH and SBCH broadcasted by a base station (i.e., for example, a 5G eNB). In an embodiment, the communication module 802 is configured to communicate RRC signaling to and from the 5G eNB 104. For example, the communication module 802 in the UE 102 can be configured to communicate the measurement report and RRC reconfiguration complete message to the 5G eNB 104.

The control signaling module 804 in the UE 102 can be configured to prepare the related RRC messages to be transmitted to the 5G eNB 104 and also can be configured to parse the related RRC message received from the 5G eNB 103.

The processor module 806 depicts a computing environment in the UE 102 for implementing a method and system for lossless inter RAT handover in the wireless communication system. The computing environment comprises at least one processing unit that is equipped with a control unit and an Arithmetic Logic Unit (ALU), a clock chip, plurality of networking devices, and a plurality Input output (I/O) devices. The processor module 806 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 808 or the storage or both. At the time of execution, the instructions may be fetched from the corresponding memory module 808 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. Further, the memory module 808 is also configured to store information related to UE operation.

The radio resource management module 810 in the UE 102 is responsible for various aspects like cell level mobility and beam level mobility etc. The radio resource management module 810 in the UE 102 may be configured to evaluate the cell selection/re-selection handover events based on the CSI-RS measurements and perform CSI-RS RSRP measurements respectively. In an embodiment, the radio resource management module 810 in the UE 102 may be configured to receive the PDCP version change indication in a handover command such as the Radio Resource Control (RRC) Reconfiguration message to perform a handover to the target base station 104b. The radio resource management module 810 in the UE 102 may be configured to performing a PDCP version change to switch from the first PDCP entity to the second PDCP entity using the PDCP re-establishment procedure in response to receiving the PDCP version change indication.

The display module 812 in the UE 102 can be configured so that user can input information or information can output on the display for the user to understand some UE 102 operations when the UE 102 is operating in dual connectivity mode of operation. Most of the UE 102 operations are transparent to the user and may not need user input or output on the display.

The processor module 806 may comprise the control signaling module 804 and the radio resource management module 810, or perform the operations performed by the control signaling module 804 and the radio resource management module 810 described above.

Figure 9:
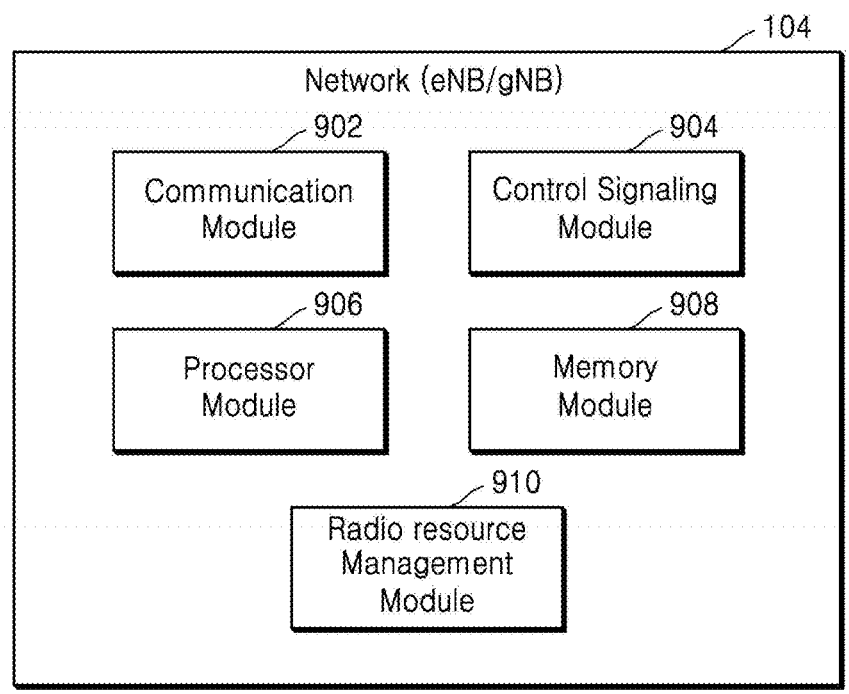
FIG. 9 illustrates various components of the network, according to an embodiment as disclosed herein.

FIG. 9 is a block diagram illustrating various modules of the network (eNB/gNB) 104, according to an embodiment as disclosed herein.

The primary blocks present in the eNB/gNB 104 for communication with the UE 102 includes a communication module 902, a control signaling module 904, a processor module 906, a memory module 908 and a radio resource management module 910. In an embodiment of the present disclosure, the communication module 1602 is configured to communicate RRC signaling to and from the UE 102. For example, the communication module 1602 in the eNB/gNB 104 can be configured to transmit RRC reconfiguration message with the PDCP version change indication to the UE 102 for handover of the UE from the source eNB 104a to the target gNB 104b. The control signaling module 904 in the eNB/gNB 104 can be configured to prepare the related RRC messages (as described above) to be transmitted to the UE 102 and also can be configured to parse the related RRC message received from the UE 102.

Further, the control signaling module 904 in the eNB/gNB 104 can be configured to determine the bearer configuration. The processor module 906 depicts a computing environment implementing the method for performing the PDCP version change in the wireless communication system. The computing environment of 906 comprises at least one processing unit that is equipped with a control unit and an Arithmetic Logic Unit (ALU), a clock chip, plurality of networking devices, and a plurality Input output (I/O) devices. The processor module 906 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 908 or the storage or both. At the time of execution, the instructions may be fetched from the corresponding memory module 908 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements.

Further, the memory module 908 is also configured to store information related to operation of the eNB/gNB 104 and the UE 102. The radio resource management module 910 in the eNB/gNB 104 may be configured to evaluate the handover decisions (based on the measurement reports sent by one or more UEs 102a-102n).

The processor module 906 can be may comprise the control signaling module 904 and the radio resource management module 910, or perform the operations performed by the control signaling module 904 and the radio resource management module 910 described above.

Figure 10:
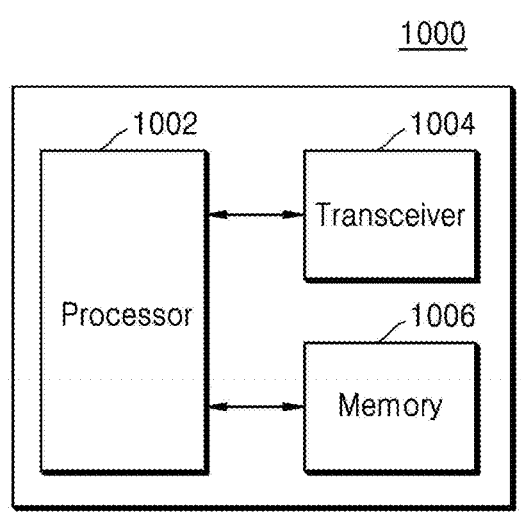
FIG. 10 illustrates a UE according to another embodiment of the present disclosure.

FIG. 10 illustrates a UE according to another embodiment of the present disclosure.

The UE may correspond to the UE 1000.

Referring to the FIG. 10, the UE 1000 may include a processor 1010, a transceiver 1004 and a memory 1006. However, all of the illustrated components are not essential. The UE 1000 may be implemented by more or less components than those illustrated in FIG. 10. In addition, the processor 1010 and the transceiver 1004 and the memory 1006 may be implemented as a single chip according to another embodiment.

The aforementioned components will now be described in detail.

The processor 1010 may include one or more processors or other processing devices that control the proposed function, process, and/or method. Operation of the UE 1000 may be implemented by the processor 1010.

The processor 1010 may detect a PDCCH on a configured control resource set. The processor 1010 determines a method for dividing CBs and a method for rate matching of a PDSCH according to the PDCCH. The processor 1010 may control the transceiver 1004 to receive the PDSCH according to the PDCCH. The processor 1010 may generate HARQ-ACK information according to the PDSCH. The processor 1010 may control the transceiver 1004 to transmit the HARQ-ACK information.

The transceiver 1004 may include a RF transmitter for up-converting and amplifying a transmitted signal, and a RF receiver for down-converting a frequency of a received signal. However, according to another embodiment, the transceiver 1004 may be implemented by more or less components than those illustrated in components.

The transceiver 1004 may be connected to the processor 1010 and transmit and/or receive a signal. The signal may include control information and data. In addition, the transceiver 1004 may receive the signal through a wireless channel and output the signal to the processor 1010. The transceiver 1004 may transmit a signal output from the processor 1010 through the wireless channel.

The memory 1006 may store the control information or the data included in a signal obtained by the UE 1000. The memory 1006 may be connected to the processor 1010 and store at least one instruction or a protocol or a parameter for the proposed function, process, and/or method. The memory 1006 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
   receiving, from a base station, a radio resource control (RRC) reconfiguration message including a packet data convergence protocol (PDCP) version change indicator or a new radio (NR) radio bearer configuration associated with at least one radio bearer (RB); and
   in case that the RRC reconfiguration message includes the PDCP version change indicator, performing a PDCP version change from an NR PDCP to an evolved universal terrestrial radio access (E-UTRA) PDCP, and
   in case that the RRC reconfiguration message includes the NR radio bearer configuration, identifying the NR radio bearer configuration including radio bearer configuration associated with the NR PDCP.

2. The method of claim 1, wherein the at least one RB is a master node (MN) terminated master cell group (MCG) bearer.

3. The method of claim 1, wherein the at least one RB is a signaling radio bearer (SRB).

4. The method of claim 1, wherein the at least one RB is a signaling radio bearer (SRB) or a data radio bearer (DRB).

5. A user equipment (UE) in a wireless communication system,
   the UE comprising:
   a transceiver; and
   at least one processor configured to:
       receive, from a base station, a radio resource control (RRC) reconfiguration message including a packet data convergence protocol (PDCP) version change indicator or a new radio (NR) radio bearer configuration associated with at least one radio bearer (RB), and
   in case that the RRC reconfiguration message includes the PDCP version change indicator, perform a PDCP version change from an NR PDCP to an evolved universal terrestrial radio access (E-UTRA) PDCP, and
   in case that the RRC reconfiguration message includes the NR radio bearer configuration, identifying the NR radio bearer configuration including radio bearer configuration associated with the NR PDCP.

6. The UE of claim 5, wherein the at least one RB is a master node (MN) terminated master cell group (MCG) bearer.

7. The UE of claim 5, wherein the at least one RB is a signaling radio bearer (SRB).

8. The UE of claim 5, wherein the at least one RB is a signaling radio bearer (SRB) or a data radio bearer (DRB).

* * * * *